US012780546B2

(12) United States Patent
Aggarwal et al.

(10) Patent No.: US 12,780,546 B2
(45) Date of Patent: Nov. 3, 2026

(54) METHOD AND SYSTEM TO FACILITATE ITEM TRANSFER IN STORAGE FACILITY

(71) Applicant: Grey Orange Inc., Roswell, GA (US)

(72) Inventors: Vivek Aggarwal, Haryana (IN); Mohit Agrawal, Maharashtra (IN); Kishore Kumar Luthra, Haryana (IN); Shivam Nagar, New Delhi (IN)

(73) Assignee: Grey Orange Inc., Roswell, GA (US)

( * ) Notice: Subject to any disclaimer, the term of this patent is extended or adjusted under 35 U.S.C. 154(b) by 718 days.

(21) Appl. No.: 18/307,333

(22) Filed: Apr. 26, 2023

(65) Prior Publication Data

US 2024/0092578 A1 Mar. 21, 2024

(30) Foreign Application Priority Data

Apr. 29, 2022 (IN) ............................ 202241025276

(51) Int. Cl.
*B65G 1/137* (2006.01)
*B65G 43/00* (2006.01)
(Continued)

(52) U.S. Cl.
CPC ........... *B65G 1/1371* (2013.01); *B65G 43/00* (2013.01); *G06Q 10/087* (2013.01);
(Continued)

(58) Field of Classification Search
CPC .................. B65G 1/1371; B65G 43/00; B65G 2201/0258; B65G 2203/0208;
(Continued)

(56) References Cited

U.S. PATENT DOCUMENTS 5,781,443 A * 7/1998 Street ............... G05B 19/41805 700/214
2002/0070846 A1* 6/2002 Bastian, II .............. G06F 3/147 340/5.92
(Continued)

FOREIGN PATENT DOCUMENTS

EP 3913340 A1 * 11/2021 ........... H04N 25/135
JP 6835973 B2 * 2/2021 ............. G06F 3/013

*Primary Examiner* — Jacob S. Scott
*Assistant Examiner* — Erin Morris
(74) *Attorney, Agent, or Firm* — Oblon, McClelland, Maier & Neustadt, L.L.P.

(57) ABSTRACT

A system and method for transferring items in a storage facility are provided. The storage facility includes a storage system that includes bins, a control server, and a sensing system. A pick-put operation on an inventory item is performed by picking the inventory item from a robotic apparatus by an operator and storing the inventory item in a corresponding bin of the storage system. The control server receives sensor signals when the sensing system automatically senses a pick-up of the inventory item from the robotic apparatus and placement of the inventory item in the corresponding bin of the storage system. The reception of the sensor signals by the control server indicates execution of the pick-put operation. Thus, a need for the operator to manually scan the inventory item during the pick-up or press any buttons on the storage system to indicate completion of the pick-put operation is eliminated.

17 Claims, 11 Drawing Sheets

(51) Int. Cl.
*G01S 17/88* (2006.01)
*G06Q 10/087* (2023.01)

(52) U.S. Cl.
CPC ................ *B65G 2201/0258* (2013.01); *B65G 2203/0208* (2013.01); *B65G 2203/042* (2013.01); *G01S 17/88* (2013.01)

(58) Field of Classification Search
CPC .......... B65G 2203/042; B65G 2209/04; G06Q 10/087; G01S 17/88
See application file for complete search history.

(56) References Cited

U.S. PATENT DOCUMENTS

| | | | | |
|---|---|---|---|---|
| 2004/0088229 | A1* | 5/2004 | Xu | B65G 1/137 705/28 |
| 2008/0183327 | A1* | 7/2008 | Danelski | B65G 1/1376 700/216 |
| 2010/0049635 | A1* | 2/2010 | Delaney | G06Q 10/08 705/28 |
| 2017/0087731 | A1* | 3/2017 | Wagner | B25J 19/06 |
| 2019/0381670 | A1* | 12/2019 | Correll | B25J 15/10 |
| 2021/0158319 | A1* | 5/2021 | Drago | A47F 1/125 |
| 2022/0104636 | A1* | 4/2022 | Chila | G01G 19/4144 |
| 2023/0056919 | A1* | 2/2023 | Post | B65G 1/137 |
| 2023/0343444 | A1* | 10/2023 | Kernick | A47B 88/969 |
| 2024/0199349 | A1* | 6/2024 | Deshpande | B65G 47/905 |
| 2024/0329210 | A1* | 10/2024 | Joseph | B65G 1/1371 |

* cited by examiner

METHOD AND SYSTEM TO FACILITATE ITEM TRANSFER IN STORAGE FACILITY

CROSS-REFERENCE TO RELATED APPLICATIONS/INCORPORATION BY REFERENCE

This Patent Application makes reference to, claims priority to, and claims the benefit of Indian provisional application 202241025276 filed Apr. 29, 2022, the contents of which are hereby incorporated herein by reference in its entirety.

FIELD

Various embodiments of the disclosure relate generally to management of inventory items in a storage facility, and more specifically to facilitate item transfer in the storage facility.

BACKGROUND

Modern day storage facilities and warehouses handle a huge number of inventory items per day. To execute pick-put operations of such inventory items, the inventory items are picked up from a storage area of a storage facility by a transport vehicle and transferred to another location such as a pick-put area of the storage facility. On arrival at the pick-put area, an operator picks up the inventory items from the transport vehicle one at a time, scans the inventory item by way of scanning apparatus that is typically hand-held by the operator, and places the scanned inventory item in a corresponding bin of a storage rack. Current solutions to indicate completion of the pick-put operation of each inventory item require the operator to perform an additional action after placing the inventory item in the storage rack. For example, after placing the inventory item in the corresponding bin, the operator presses a button on the storage rack that is associated with the bin to indicate the completion of the pick-put operation. Thus, the completion of the pick-put operation relies on a memory of the operator to press the button each time an inventory item is placed in a corresponding bin. Current solutions create unreliability as the operator may place the item in one bin and accidentally press the button associated with another bin on the storage rack. In addition, the process of pressing the button each time for indicating completion of the pick-put operation consumes additional time. Furthermore, the process of scanning the inventory item by way of a hand-held apparatus increases the overall process time of the pick-put operation and causes a burden on the operator to scan each inventory item. Thus, the current solutions result in reduced efficiency in order fulfillment at the storage facilities and warehouses.

In light of the foregoing, there exists a need for a technical and reliable solution that overcomes the abovementioned problems and improves the efficiency of storage facilities to facilitate an item transfer in the storage facilities.

Limitations and disadvantages of conventional approaches will become apparent to one of skill in the art, through comparison of described systems with some aspects of the present disclosure, as outlined in the remainder of the present application and with reference to the drawings.

SUMMARY

Embodiments of the present disclosure provide a method to facilitate item transfer in a storage facility. The method includes selecting, by a control server, a first bin of a plurality of bins of a storage system to store a first inventory item. The storage system is located in the storage facility. The method further includes receiving, by the control server, from a sensing system, based on the selection of the first bin, a first sensor signal indicating a first position of the first inventory item and a second position of a hand of an operator who is assigned to execute a pick-put operation on the first inventory item. Further, the method includes detecting, by the control server, that the pick-put operation is being performed on the first inventory item based on the first sensor signal indicating that the first position and the second position are the same. The method further includes receiving, by the control server, from the sensing system, a second sensor signal at predetermined time intervals. The second sensor signal indicates an occupancy state of each of the plurality of bins and a presence of the hand of the operator in the vicinity of any of the plurality of bins. Further, the method includes detecting, by the control server, based on the second sensor signal, whether the occupancy state of any of the plurality of bins is changed and whether the hand of the operator is present in the vicinity of any of the plurality of bins. Additionally, the method includes determining, by the control server, whether the pick-put operation of the first inventory item is successful or unsuccessful based on the detection that the occupancy state of any of the plurality of bins has changed and the hand of the operator is present in the vicinity of any of the plurality of bins.

Embodiments of the present disclosure provide a system to facilitate item transfer in a storage facility. The system includes a storage system that includes a plurality of bins, a sensing system, and a control server. The storage system is located in the storage facility. The sensing system is configured to generate a first sensor signal and a second sensor signal. The first sensor signal indicates a first position of a first inventory item and a second position of a hand of an operator who is assigned to execute a pick-put operation on the first inventory item, and the second sensor signal indicates an occupancy state of each of the plurality of bins and the hand of the operator in vicinity of the plurality of bins. The control server communicates with the sensing system and the storage system. The control server is configured to select a first bin of the plurality of bins to store the first inventory item. The control server is further configured to receive based on the selection of the first bin, from the sensing system, the first sensor signal and the second sensor signal. The control server receives the second sensor signal at pre-determined time intervals. Further, the control server is configured to detect whether the pick-put operation is being performed on the first inventory item based on the first sensor signal. The control server is further configured to detect based on the second sensor signal, whether the occupancy state of any of the plurality of bins is changed and whether the hand of the operator is present in the vicinity of any of the plurality of bins. The control server is further configured to determine whether the pick-put operation of the first inventory item is successful or unsuccessful based on the detection that the occupancy state of any of the plurality of bins has changed and the hand of the operator is present in the vicinity of any of the plurality of bins.

In some embodiments of the present disclosure, the operator is one of a human operator or a robotic operator.

In some embodiments of the present disclosure, the second sensor signal is generated by the sensing system and transmitted to the control server. Further, the second sensor signal indicates the presence of the hand based on an obstruction detected by the sensing system in the vicinity of any of the plurality of bins.

In some embodiments of the present disclosure, the method further includes generating, by the control server, placement information indicating that the first inventory item is to be stored in the first bin based on the selection of the first bin. The method further includes transmitting, by the control server to an operator device, the placement information. The pick-put operation is performed on the first inventory item based on the placement information.

In some embodiments of the present disclosure, the storage system is a pick-put to light (PPTL)-based system. A first visual indicator of the PPTL-based system is mapped to the first bin, and a second visual indicator of the PPTL-based system is mapped to a second bin.

In some embodiments of the present disclosure, the method further includes generating, by the control server, a first illumination signal, based on the selection of the first bin and transmitting, by the control server, the first illumination signal, to the PPTL-based system. Based on the first illumination signal, the first visual indicator illuminates in a first color to set the first bin as a target for the pick-put operation of the first inventory item.

In some embodiments of the present disclosure, the method further includes transmitting, by the control server, an activation signal to the sensing system concurrently with the first illumination signal. Based on the activation signal, the sensing system is activated.

In some embodiments of the present disclosure, the method further includes generating, by the control server, a second illumination signal based on the determination that the pick-put operation of the first inventory item is successful. The pick-put operation of the first inventory item is determined to be successful based on the detection that the occupancy state of the first bin is changed and the hand of the operator is detected to be present in the vicinity of the first bin. The method further includes transmitting, by the control server, the second illumination signal to the PPTL-based system.

In some embodiments of the present disclosure, based on the second illumination signal, the first visual indicator illuminates in a second color as an acknowledgment for a successful completion of the pick-put operation.

In some embodiments of the present disclosure, the pick-put operation of the first inventory item is determined to be unsuccessful based on the detection that at least one of the occupancy state of the first bin is unchanged and the occupancy state of the second bin of the plurality of bins has changed or the hand of the operator is detected to be present in the vicinity of the second bin instead of the first bin.

In some embodiments of the present disclosure, the method further includes generating, by the control server, a third illumination signal, when the pick-put operation of the first inventory item is determined to be unsuccessful based on the detection that the occupancy state of the first bin is unchanged and the occupancy state of the second bin is changed. The method further includes transmitting, by the control server, the third illumination signal, to the PPTL-based system. Based on the third illumination signal, the second visual indicator illuminates in a third color to indicate that the first inventory item is incorrectly stored in the second bin after the pick-put operation.

In some embodiments of the present disclosure, the pick-put operation of the first inventory item is determined to be unsuccessful based on the detection that at least one of the occupancy state of the first bin remains unchanged after a threshold time duration or the hand of the operator is not detected in the vicinity of the first bin within the threshold time duration.

In some embodiments of the present disclosure, the control server detects that the pick-put operation is being performed on the first inventory item based on the first sensor signal. Further, the first sensor signal indicates that the first position and the second position are the same.

In some embodiments of the present disclosure, the system further includes a robotic apparatus, and the first inventory item is placed above the robotic apparatus.

In some embodiments of the present disclosure, the sensing system is a light detection and ranging (LiDAR) system. The second sensor signal that is generated by the sensing system and transmitted to the control server indicates the presence of the hand based on an obstruction detected by the sensing system in the vicinity of any of the plurality of bins.

In some embodiments of the present disclosure, the storage system is a pick-put to light (PPTL)-based system. The storage system further includes the first visual indicator and the second visual indicator. The first visual indicator is mapped to the first bin, and the second visual indicator is mapped to the second bin of the plurality of bins. The storage system is configured to illuminate the first visual indicator based on the first illumination signal and the second illumination signal, and the second visual indicator based on the third illumination signal.

Methods and systems for facilitating item transfer in a storage facility are provided substantially as shown in, and described in connection with, at least one of the figures, as set forth. The system may include a control server, bins, one or more storage units, one or more operators, one or more storage systems, one or more sensing systems, and one or more robotic apparatus communicably coupled to the control server. One or more storage units are bought to a pick-put area by a robotic apparatus. The control server may be configured to select one of the bins for the pick-put operation. The control server may be further configured to generate a placement information of an inventory item that is to be placed in the selected bin, and transmit the placement information to an operator device. The control server may further receive, from a sensing system, a sensor signal indicating a position of the inventory item as well as a hand of an operator. Based on the sensor signal, the control server may detect that the pick-put operation is being performed on the inventory item. Further, the control server may receive another sensor signal at predetermined time intervals that indicates the occupancy state of the bins and the presence of the hand of the operator in the vicinity of the bins. Based on the other sensor signal, the control server may detect a change in the occupancy state of the selected bin and the presence of the hand of the operator in the vicinity of the selected bin. The control server may be further configured to determine whether the pick-put operation of the inventory item is successful or unsuccessful based on the detection that the occupancy state of any of the bins has changed and the hand of the operator is present in the vicinity of any of the bins.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Various embodiments of the present disclosure provide a method and a system to facilitate item transfer in a storage facility. The method and system provide a technical solution to eliminate a need for an operator to hold any scanning apparatus to scan an inventory item. The method and system further provide a technical solution to indicate completion of a pick-put operation thereby eliminating the need for the operator to perform any additional action to indicate the completion of the pick-put operation.

Figure 1:
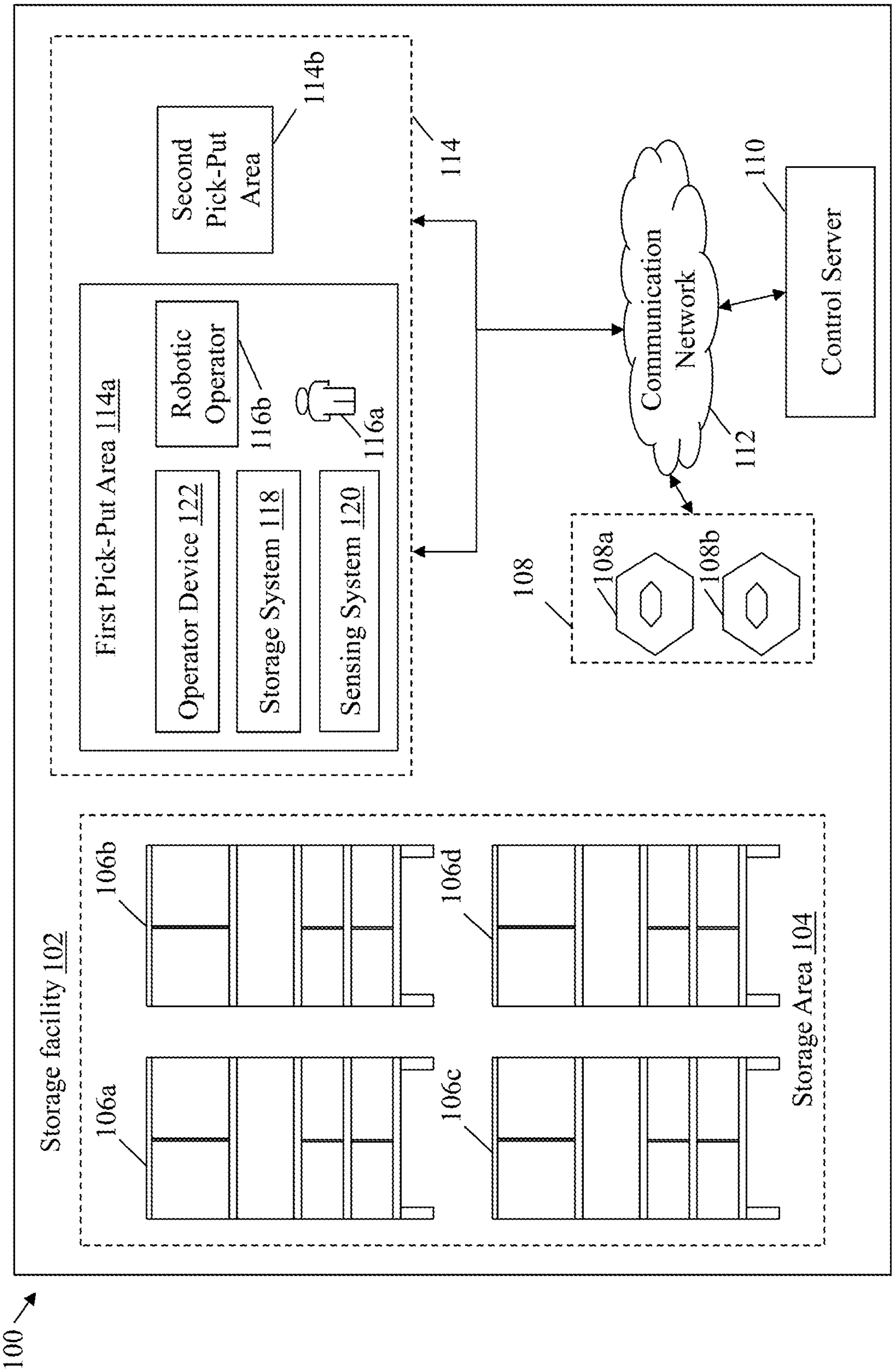
FIG. 1 is a block diagram that illustrates a system environment to facilitate item transfer in a storage facility, in accordance with an exemplary embodiment of the present disclosure.

FIG. 1 is a block diagram that illustrates a system environment 100 to facilitate item transfer in a storage facility 102, in accordance with an exemplary embodiment of the disclosure. The storage facility 102 includes a storage area 104. The storage area 104 includes a plurality of storage units 106*a*-106*d*. The storage facility 102 further includes a plurality of robotic apparatus 108 of which a first robotic apparatus 108*a* and a second robotic apparatus 108*b* are shown. The storage facility 102 further includes a control server 110, a communication network 112, and a plurality of pick-put areas 114 of which a first pick-put area 114*a* and a second pick-put area 114*b* are shown. At least one of a human operator 116*a* or a robotic operator 116*b* may be present at the first pick-put area 114*a*. The plurality of pick-put areas 114 and the plurality of robotic apparatus 108 may communicate with the control server 110 by way of the communication network 112 or via separate communication networks established therebetween. The plurality of pick-put areas 114 may be communicatively coupled to the control server 110 to receive instructions for transferring inventory items. One or more concepts regarding the transfer of inventory items are described in detail in conjunction with FIGS. 3-4.

The storage facility 102 may be a warehouse facility where inventory items or packages of inventory items are stored for order fulfillment and/or selling. Examples of the storage facility 102 may include, but are not limited to, a forward warehouse, a backward warehouse, a fulfillment center, or a retail store (e.g., a supermarket, an apparel store, a departmental store, a grocery store, or the like). Examples of the inventory items may include, but are not limited to, groceries, apparel, electronic goods, mechanical goods, or the like. The range of inventory items may further vary in size, shape, weight, control conditions, dimensions, or the like. The storage facility 102 may have the storage area 104 where the plurality of storage units 106*a*-106*d* are placed for storing the inventory items. The storage area 104 may be of any shape, for example, a rectangular shape, a circular shape, or the like.

The plurality of storage units 106*a*-106*d* may be at least one of movable storage devices or affixed to the ground. In an example, the plurality of storage units 106*a*-106*d* may include a first storage unit 106*a*, a second storage unit 106*b*, a third storage unit 106*c*, and a fourth storage unit 106*d*. The plurality of storage units 106*a*-106*d* store various inventory items and/or various packages on shelves of the plurality of storage units 106*a*-106*d* or in totes that may be placed on the shelves. The inventory items and/or packages may be of different dimensions, types, shapes, materials, and capacities. Each of the plurality of storage units 106*a*-106*d* may further include a reference marker associated therewith for uniquely identifying the corresponding storage unit. Examples of the reference marker may include, but are not limited to, a barcode, a quick response (QR) code, a radio frequency identification device (RFID) tag, or the like. The plurality of storage units 106*a*-106*d* are transported (or moved) from one location to another location by any of the plurality of robotic apparatus 108 (e.g., robotic rangers, automated guided vehicles (AGVs), or the like) used in the storage facility 102.

The plurality of robotic apparatus 108 may be robotic vehicles that move within the storage facility 102. For example, the first robotic apparatus 108*a* and the second robotic apparatus 108*b* may be AGVs or autonomous robotic vehicles that are responsive to commands received from the control server 110. The plurality of robotic apparatus 108 may include suitable logic, instructions, circuitry, interfaces, and/or codes, executable by the circuitry, for transporting inventory items or totes having the inventory items in the storage facility 102 based on the commands received from the control server 110. For example, the first robotic apparatus 108*a* may carry and transport the first storage unit 106*a* from the storage area 104 to the first pick-put area 114*a*. The first robotic apparatus 108*a* may be configured to read the fiducial markers on the working floor of the storage facility 102. The first robotic apparatus 108*a* may include various sensors (e.g., image sensors, RFID sensors, and/or the like) for reading the fiducial markers. In another example, the second robotic apparatus 108*b* may have an adjustable height to access topmost shelves as well as base shelves of any of the plurality of storage units 106*a*-106*d*. In yet another example, the first robotic apparatus 108*a* may be configured to carry totes having the inventory items from the storage area 104 to the first pick-put area 114*a*. In yet another example, the first robotic apparatus 108*a* may be configured to directly carry the inventory items from the storage area 104 to the first pick-put area 114*a*.

In an embodiment, the storage facility 102 may be fully automated (i.e., dark store) that does not require human assistance. In such an embodiment, a movement of inventory items within the storage facility 102 may be performed by the first robotic apparatus 108*a*, the second robotic apparatus 108*b*, or any other type of automated robotic assembly.

The control server 110 may include suitable logic, circuitry, interfaces, and/or code, executable by the circuitry, to facilitate item transfer in the storage facility 102. Examples of the control server 110 may include, but are not limited to, personal computers, laptops, mini-computers, mainframe computers, any non-transient and tangible machine that can execute a machine-readable code, cloud-based servers, distributed server networks, or a network of computer systems. The control server 110 may be realized through various web-based technologies such as, but not limited to, a Java web-framework, a .NET framework, a personal home page (PHP) framework, or any other web-application framework. The control server 110 may be part of an automated warehouse management system (WMS), which may be a standalone system. Alternatively, the control server 110 may be integrated with the automated WMS. In certain embodiments, the control server 110 may be integrated with supply chain systems and/or integrated enterprise resource planning (ERP) systems. It will be understood by a person having ordinary skill in the art that the control server 110 may execute other storage facility management operations as well as facilitate item transfer in the storage facility 102. The storage facility management and item transfer operations of the control server 110 are explained in detail in FIG. 2.

The plurality of pick-put areas 114 may refer to platforms or stations where pick-put operations are performed on the inventory items for quality assurance, order consolidation, stock replenishment, inventory rotation, or the like. In other words, the plurality of pick-put areas 114 may serve as an interface for order consolidation as well as the transfer of inventory items from the plurality of robotic apparatus 108 and/or the plurality of storage units 106*a*-106*d* to a corresponding storage system such as a storage system 118 and vice versa. The plurality of pick-put areas 114 may be operated by manual operators such as the human operator 116*a*, robotic operators such as the robotic operator 116*b*, and/or a combination thereof. One or more operations to be carried out at the plurality of pick-put areas 114 may be manual, semi-automatic, or automatic. Each of the plurality of pick-put areas 114 may further include a corresponding sensing system, a corresponding object detection device, and a corresponding operator device. Thus, the first pick-put area 114*a* includes the storage system 118, a sensing system 120, and an operator device 122.

The storage system 118 may be a pick-put-to-light (PPTL) based storage system that includes a plurality of bins (shown in FIGS. 2 and 3) to store corresponding inventory items such that the storage system 118 may be located in the storage facility 102. The storage system 118 may further include a reference marker associated therewith for uniquely identifying the storage system 118. Examples of the reference marker may include, but are not limited to, a barcode, a quick response (QR) code, a radio frequency identification device (RFID) tag, or the like. The storage system 118 includes a plurality of storage shelves such that each storage shelf includes a corresponding set of bins of the plurality of bins. Each bin of the plurality of bins is configured to store inventory items associated with a single order. The storage system 118 further includes a plurality of visual indicators (shown in FIGS. 2 and 3) such that each visual indicator is mapped to a corresponding bin. Each of the visual indicators is configured to illuminate in different colors based on illumination signals provided by the control server 110. The visual indicators visually guide the human operator 116*a* to place inventory items for a corresponding order in the associated bin, and further visually indicate whether the pick-put operation is unsuccessful or successful. In an embodiment, the visual indicators may be further configured to display the number of inventory items associated with the corresponding order.

The sensing system 120 may be a light detection and ranging (LiDAR) system. The sensing system 120 has a sensing range that covers the first pick-put area 114*a*. The sensing system 120 includes a LiDAR sensor and suitable processing circuitry that may be configured to convert an output signal of the LiDAR sensor to an electrical signal, i.e., at least one of a first sensor signal or a second sensor signal. In an embodiment, the LiDAR sensor may be affixed at a center of the topmost shelf of the storage system 118. In another embodiment, the LiDAR may be attached to a frame (not shown) of the first pick-put area 114*a* by way of a mechanical arrangement that enables changing the position of the sensing system 120 on the frame based on parameters such as speed, types, and dimensions of the plurality of robotic apparatus 108, a type of the inventory item to be handled by the human operator 116*a*, and the like. The control server 110 further controls the change in position of the LiDAR sensor by way of the mechanical arrangement. In yet another embodiment, a position of the LiDAR sensor is variable, i.e., the LiDAR sensor can be placed in any suitable location in the first pick-put area 114*a*.

The sensing system 120 is configured to generate the first sensor signal that indicates a first position of an inventory item and a second position of the hand of the operator who is assigned to execute a pick-put operation on the inventory item. The first position of the inventory item and the second position of the hand of the operator are positions of the inventory item and the hand of the operator based on the initiation of the pick-put operation of the inventory item, respectively. The sensing system 120 is further configured to generate the second sensor signal that indicates an occupancy state of each of the plurality of bins and a presence of the hand of the operator in the vicinity of any of the plurality of bins. The occupancy state of each of the plurality of bins indicates whether a corresponding bin is in an occupied state or an empty state. In an example, an inventory item is to be placed in a selected bin of the storage system 118. When the selected bin is empty, i.e., the inventory item is yet to be placed in the selected bin, the occupancy state of the selected bin indicates an empty state. When the inventory item is placed in the selected bin, the occupancy state of the selected bin indicates an occupied state. The occupancy state may further indicate a number of inventory items that occupy the selected bin. Thus, a change in occupancy state may indicate a change in the number of inventory items stored in the selected bin. The occupancy state may further indicate a partially occupied state of the selected bin when more than one inventory item is to be placed in the selected bin. The sensing system 120 may further detect the presence of the hand of the operator in the vicinity of the plurality of bins based on an obstruction detected in the vicinity of any of the plurality of bins. In operation, the sensing system 120 may be configured to emit pulsed light waves into the first pick-put area 114*a*. The emitted pulsed light waves may be in the form of LASER pulses. Further, the pulsed light waves may bounce off surrounding objects that behave as an obstruction in the path of the emitted pulsed light. The obstruction can be any object such as the plurality of bins, the hand of the operator, the storage unit, and the like. The sensing system 120 further determines the time taken for each pulsed light wave to return to the sensor. Further, the control server 110 receives the second sensor signal indicating the time taken by the pulsed light wave to return to the sensing system 120 and hence determines the occupancy state and the presence of the hand of the operator in the vicinity of the plurality of bins. The sensing system 120 generates the second sensor signals at predetermined time intervals and provides the second sensor signals at predetermined time intervals to the control server 110. The provision of the second sensor signals at predetermined time intervals to the control server 110 is explained in detail in FIGS. 3 and 4.

In an embodiment, the sensing system 120 generates the second sensor signal by at least sensing the placement of an inventory item in a corresponding bin or detecting a motion of a hand of the human operator 116*a* or the robotic operator 116*b* in the vicinity of any of the plurality of bins. In the example, the sensing system 120 may be activated based on an activation signal provided by the control server 110. When the human operator 116*a* or the robotic operator 116*b* carries an inventory item in the vicinity of a corresponding bin for placing the inventory item in the bin, the sensing system 120 senses the hand of the human operator 116*a* or an arm of the robotic operator 116*b* carrying the inventory item in the vicinity of the bin and verifies for the change in the occupancy state of the corresponding bin. On detection of change in the state of the corresponding bin, the sensing system 120 conveys the change of occupancy state of the bin by way of the second sensor signal. In the presently preferred embodiment, the LiDAR sensor senses the placement of the inventory item in the corresponding bin and a motion of a hand of the human operator 116*a* or an arm of the robotic operator 116*b* in the vicinity of any of the plurality of bins. In other embodiments, the sensing system 120 may be any of a light-based, ultrasonic-based, or sound-based sensing system that may be configured to sense the placement of the inventory item based on an obstruction of a signal emitted from any of the aforementioned sensing systems.

Although in the present disclosure only a single sensing system may be disclosed, in various embodiments, more than one sensing system may be present. In one embodiment, a second sensing system may be a handheld apparatus that may be held by the human operator 116*a* or placed in the vicinity of the human operator 116*a* such that the human operator 116*a* may scan the inventory items by positioning the inventory items in front of the second sensing system. In one embodiment, the second sensing system may be a scanning device such as a barcode scanner, a camera, or an RFID reader, that is capable of scanning identifiers (such as barcodes or RFID tags) of the inventory items. The human operator 116*a* scans the inventory items based on instructions received from the control server 110 on the operator device 122.

In another embodiment, the second sensing system may be a sensing apparatus thereby eliminating the need to manually scan the inventory item by the human operator 116*a*. The second sensing system may be placed on the storage bin. In an example, the pick-put operation is to be performed on an inventory item placed in the first storage unit 106*a*. When the first robotic apparatus 108*a* arrives at the first pick-put area 114*a* with the first storage unit 106*a*, the human operator 116*a* retrieves the inventory item therefrom. The second sensing system automatically senses the pick-up of the inventory item and communicates the details of the pick-up to the control server 110. The second sensing system may have the same components as the sensing system 120 or different components than the sensing system 120.

The operator device 122 may be a display screen such as an LCD monitor that may display the inventory item that needs to be picked by the human operator 116*a* for performing the pick-put operation. The operator device 122 may further indicate a number of units of the inventory items that need to be picked. The operator device 122 is configured to receive the placement information of an inventory item from the control server 110. Other examples of the operator device 122 may include a projector, a monitor, a touch screen, or the like.

For the sake of ongoing discussion and without deviating from the scope of the disclosure, it is assumed that the human operator 116*a* picks an inventory item from a tote on any of the plurality of robotic apparatus 108, the plurality of storage units 106*a*-106*d* that are brought by way of the plurality of robotic apparatus 108, and/or directly from a surface of any of the plurality of robotic apparatus 108 and places the inventory item in a corresponding bin of the storage system 118 for storage. However, it will be understood by a person skilled in the art that the robotic operator 116*b* may perform similar functions.

In operation, to initiate the pick-put operation of an inventory item, the control server 110 may be configured to communicate with the sensing system 120 and the storage system 118. The control server 110 may be further configured to select a bin of a plurality of bins of the storage system 118 to store the inventory item. The control server 110 communicates with one of the plurality of robotic apparatus 108 such as the first robotic apparatus 108*a* to retrieve the inventory item. The inventory item may be stored in the first storage unit 106*a*. The first robotic apparatus 108*a* travels to the storage area 104 to bring the inventory item directly, or the first storage unit 106*a* having the inventory item, or a tote having the inventory item to the first pick-put area 114*a*. The control server 110 further communicates details of the inventory item and the placement information of the inventory item to the operator device 122. The details of the inventory item may include an identifier such as an RFID or a tag of the inventory item.

On arrival of the first robotic apparatus 108*a* at the first pick-put area 114*a*, the control server 110 transmits the activation signal to the sensing system 120. The sensing system 120 is activated based on the activation signal provided by the control server 110. Further, the sensing system 120 generates and transmits the first sensor signal indicating the first position of the inventory item and the second position of the hand of the human operator 116*a* to the control server 110. The human operator 116*a* retrieves the inventory item from one of the first storage unit 106*a*, or the tote on the first robotic apparatus 108*a*, or directly from the top surface of the first robotic apparatus 108*a*. In an example, the inventory item is picked from a first shelf of the first storage unit 106*a*. Thus, the first position of the inventory item is at the first shelf of the first storage unit 106*a*. Further, the human operator 116*a* moves their hand to pick up the inventory item from the first shelf of the first storage unit 106*a*. Thus, the second position of the hand of the human operator 116*a* is at the first shelf of the first storage unit 106*a*. The control server 110 detects that the pick-put operation is being performed on the inventory item based on the first sensor signal. In other words, the control server 110 detects that the pick-put operation is being performed on the inventory item based on the first sensor signal when the first sensor signal indicates that the first position and the second position are the same. The control server 110 further generates a first illumination signal, based on the selection of the bin for storing the inventory item and transmits the first illumination signal, to the storage system 118. Based on the first illumination signal, a visual indicator associated with the selected bin illuminates in a first color to set the selected bin as a target for the pick-put operation of the inventory item. The control server 110 further transmits the activation signal to the sensing system 120 concurrently with the first illumination signal.

Based on the selected bin illuminating in the first color, the human operator 116*a* places the retrieved inventory item in the selected bin by bringing the retrieved inventory item in the vicinity of the selected bin. To generate the second sensor signal, the sensing system 120 detects the hand of the human operator 116*a* in the vicinity of the plurality of bins. The sensing system 120 further senses the placement of the inventory item in the selected bin. The sensing system 120 provides the second sensor signal to the control server 110. The control server 110 receives the second sensor signal from the sensing system 120 at pre-determined intervals. The control server 110, based on the second sensor signal, detects whether the occupancy state of the selected bin has changed, and whether the hand of the operator is present in the vicinity of any of the plurality of bins. Further, the control server 110 determines whether the pick-put operation of the retrieved inventory item is successful or unsuccessful based on the detection that the occupancy state of the selected bin has changed and the hand of the operator is present in the vicinity of any of the plurality of bins.

The pick-put operation of the retrieved inventory item is determined to be successful based on the detection that (i) the occupancy state of the selected bin has changed and (ii) the hand of the operator in the vicinity of the selected bin. The control server 110 thus generates a second illumination signal based on the determination that the pick-put operation of the retrieved inventory item is successful, and transmits the second illumination signal to the storage system 118. Based on the second illumination signal, the visual indicator associated with the selected bin changes illumination from the first color to a second color as an acknowledgment of a successful completion of the pick-put operation. The successful completion of the pick-put operation is further explained in reference to FIGS. 3A and 3B.

The pick-put operation of the retrieved inventory item is determined to be unsuccessful based on the detection that the occupancy state of the selected bin is unchanged and the occupancy state of another bin of the plurality of bins has changed or based on the detection of the hand of the operator in the vicinity of another bin. In a scenario, the retrieved inventory item is placed in a bin other than the selected bin. The control server 110 thus generates and transmits a third illumination signal, to the storage system 118 based on the determination that the pick-put operation of the retrieved inventory item is unsuccessful. Based on the third illumination signal, a visual indicator mapped to the other bin illuminates in a third color to indicate that the retrieved inventory item is incorrectly stored in the other bin.

Figure 4A:
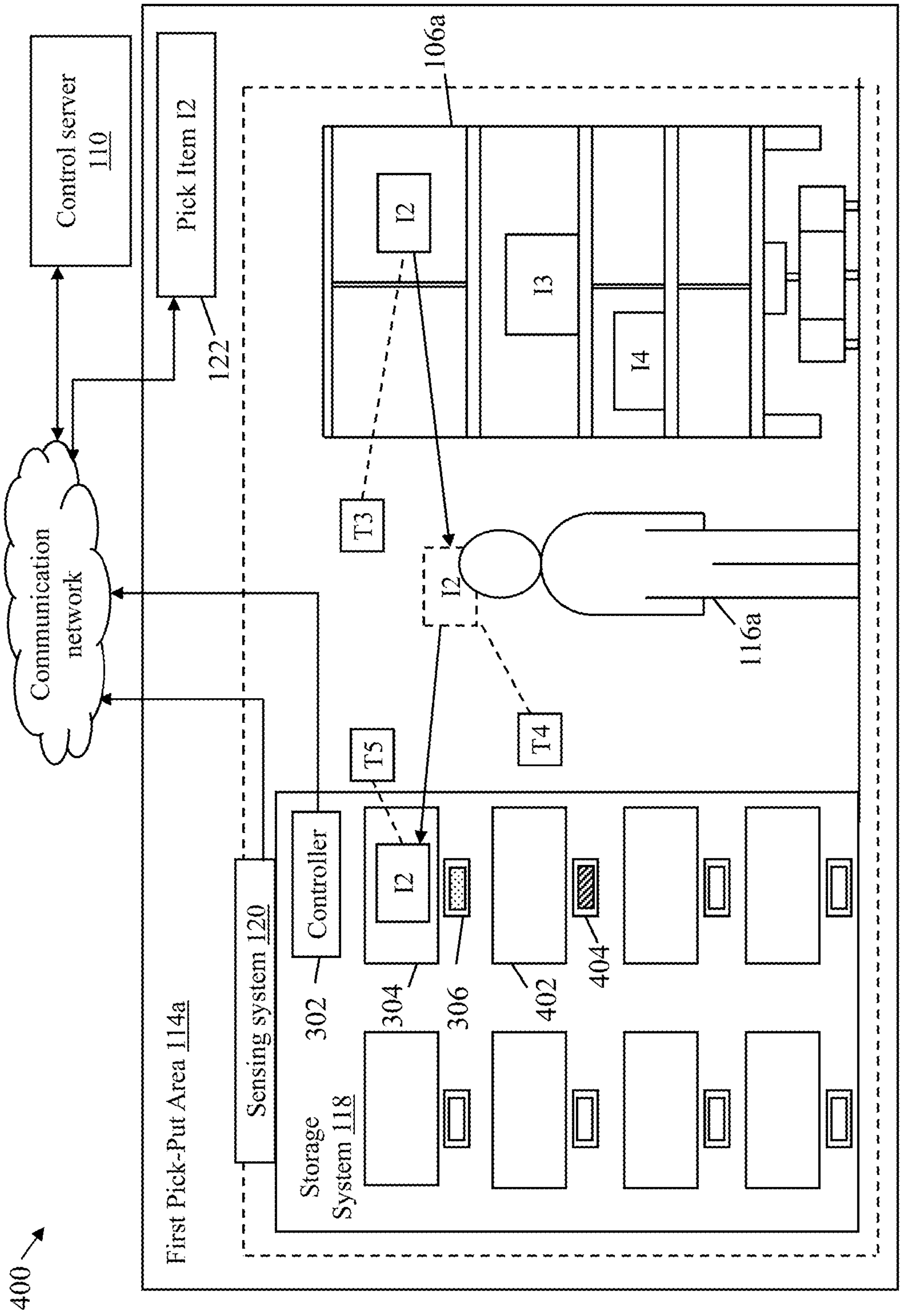
FIGS. 4A-4B represent a block diagram that illustrates another pick-put operation at the storage facility of FIG. 1, in accordance with an exemplary embodiment of the present disclosure.
Figure 4B:
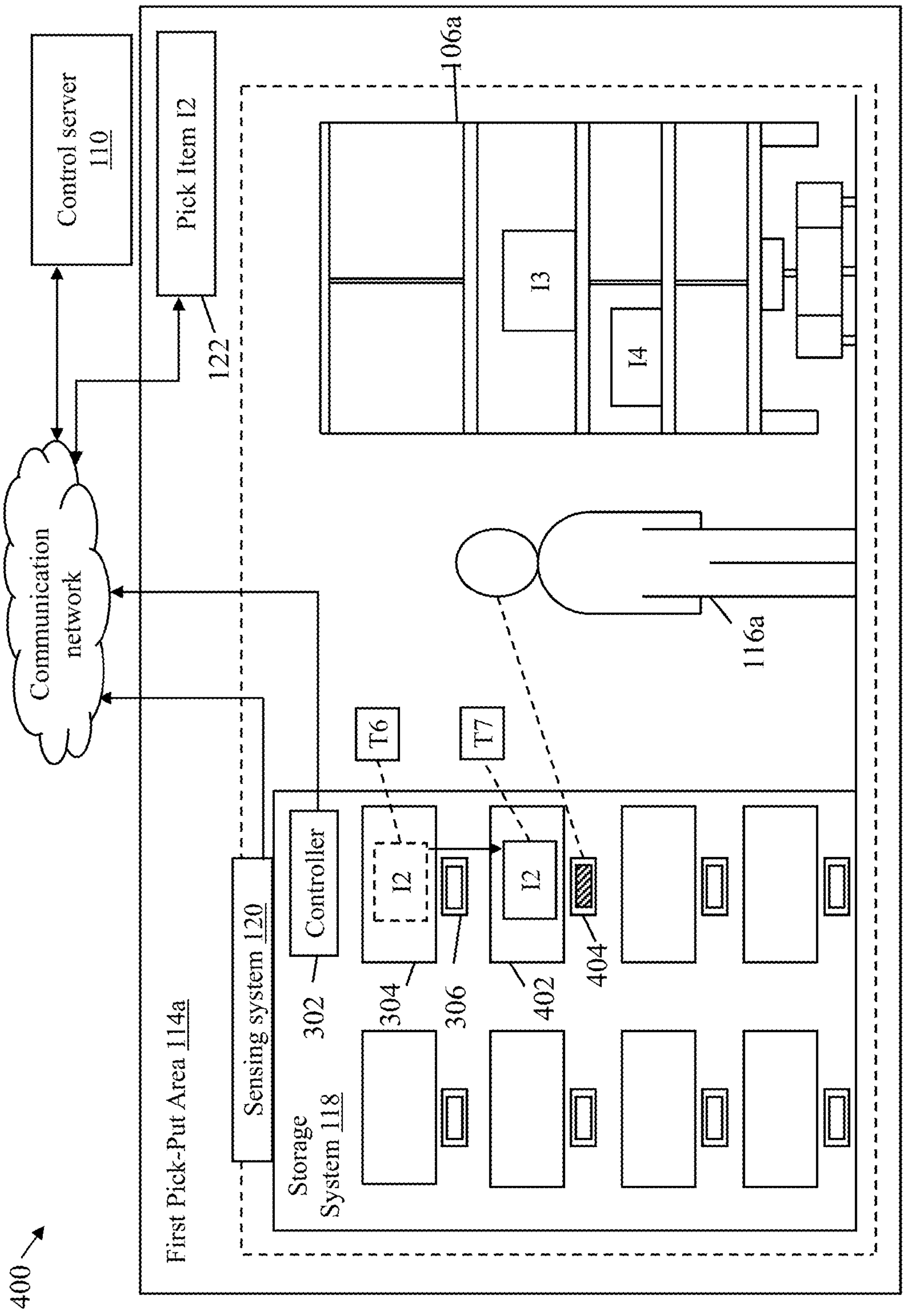

The failure of the pick-put operation and the correction of the failure of the pick-put operation are explained in detail in FIGS. 4A and 4B.

In another scenario, the pick-put operation of the retrieved inventory item is further determined to be unsuccessful based on the detection that the occupancy state of the selected bin is unchanged after a threshold time duration or the hand of the operator is not detected in the vicinity of the selected bin for the threshold time duration. In an example, if the control server 110 does not detect a change in the occupancy state of the selected bin or the presence of the hand of the operator in the vicinity of the selected bin after a threshold time duration (say 20 seconds) from the initiation of the pick-put operation on the inventory item, the control server 110 determines that the pick-put operation is unsuccessful.

In another embodiment, the pick-put operation may be performed by picking up an inventory item from the storage system 118 and placing it on any of the plurality of robotic apparatus 108 that arrives at the first pick-put area 114*a*. In such an embodiment, the sensing system 120 senses the pick-up of the inventory item from a corresponding bin of the storage system 118. The sensing system 120 detects the presence of the hand of the operator in the vicinity of the corresponding bin based on the obstruction in the sensing range caused by the hand of the operator. Further, the sensing system 120 determines the change in the occupancy state of the corresponding bin after the pick operation and provides the second sensor signal to the control server 110 indicating the occupancy state of the plurality of bins and the presence of the hand in the vicinity of the plurality of bins. The control server 110 may further determine the pick operation to be unsuccessful when the occupancy state of the corresponding bin remains unchanged and the hand of the operator is absent in the vicinity of the corresponding bin. The pick operation is further determined to be unsuccessful when the control server 110 determines that the hand of the operator is present in the vicinity of another bin and the occupancy state of the other bin is changed.

In the above embodiment, based on another sensor signal generated by the sensing system 120, the placement of the selected inventory item on a mapped robotic apparatus such as the first robotic apparatus 108*a* can be determined by the control server 110. In a scenario, the inventory item is incorrectly placed by the human operator 116*a* on a different robotic apparatus such as the second robotic apparatus 108*b*. The sensor signal may indicate to the control server 110 that the selected inventory item is placed in a tote on the second robotic apparatus 108*b*. The sensor signal may indicate a position of the inventory item and provide details such as height at which the tote is present on the second robotic apparatus 108*b* or the distance at which the tote and the second robotic apparatus 108*b* are present from a predetermined point in the first pick-put area 114*a*. The control server 110 may receive the height and distance information from the sensor signal and compare it with the generated placement information to determine whether the put operation is successful. Further, the first robotic apparatus 108*a* may communicate with the control server 110 regarding an absence of the inventory item on the first robotic apparatus 108*a* whereas the second robotic apparatus 108*b* may communicate with the control server 110 that the inventory item is placed on the second robotic apparatus 108*b* thereby indicating failure of the put operation. The control server 110 may thus communicate again with the operator device 122 to display details of the placement for the inventory item on the first robotic apparatus 108*a*. The sensing system 120 is thus able to sense the placement of the inventory item on a corresponding robotic apparatus thereby eliminating a need for the human operator 116*a* to hold any scanning apparatus to scan the details of the inventory item for placement on the robotic apparatus.

In yet another embodiment, the storage system 118 may be one of audio-based pick-put system as compared to a PPTL-based system to place the inventory item in a corresponding bin of one of the aforementioned systems. The audio-based pick-put system may include audio-based indicators (such as automated speakers) to indicate the placement information to the human operator 116*a* or the robotic operator 116*b* based on audio instructions. Examples of audio instructions can be recorded voice instructions, buzzers, alarms, or the like. In yet another embodiment, the storage system 118 may include automatic sliding doors as compared to the storage system 118 being a PPTL-based system. When the storage system 118 includes automatic sliding doors, the doors of the corresponding bins may automatically slide open or close based on an instruction received from the control server 110.

The communication network 112 is a medium through which instructions and messages are transmitted between the control server 110 and at least one of the plurality of pick-put areas 114 and the plurality of robotic apparatus 108. Examples of the communication network 112 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, and a combination thereof. Various entities (such as the first robotic apparatus 108*a*, the second robotic apparatus 108*b*, and the control server 110) in the system environment 100 may be coupled to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Figure 2:
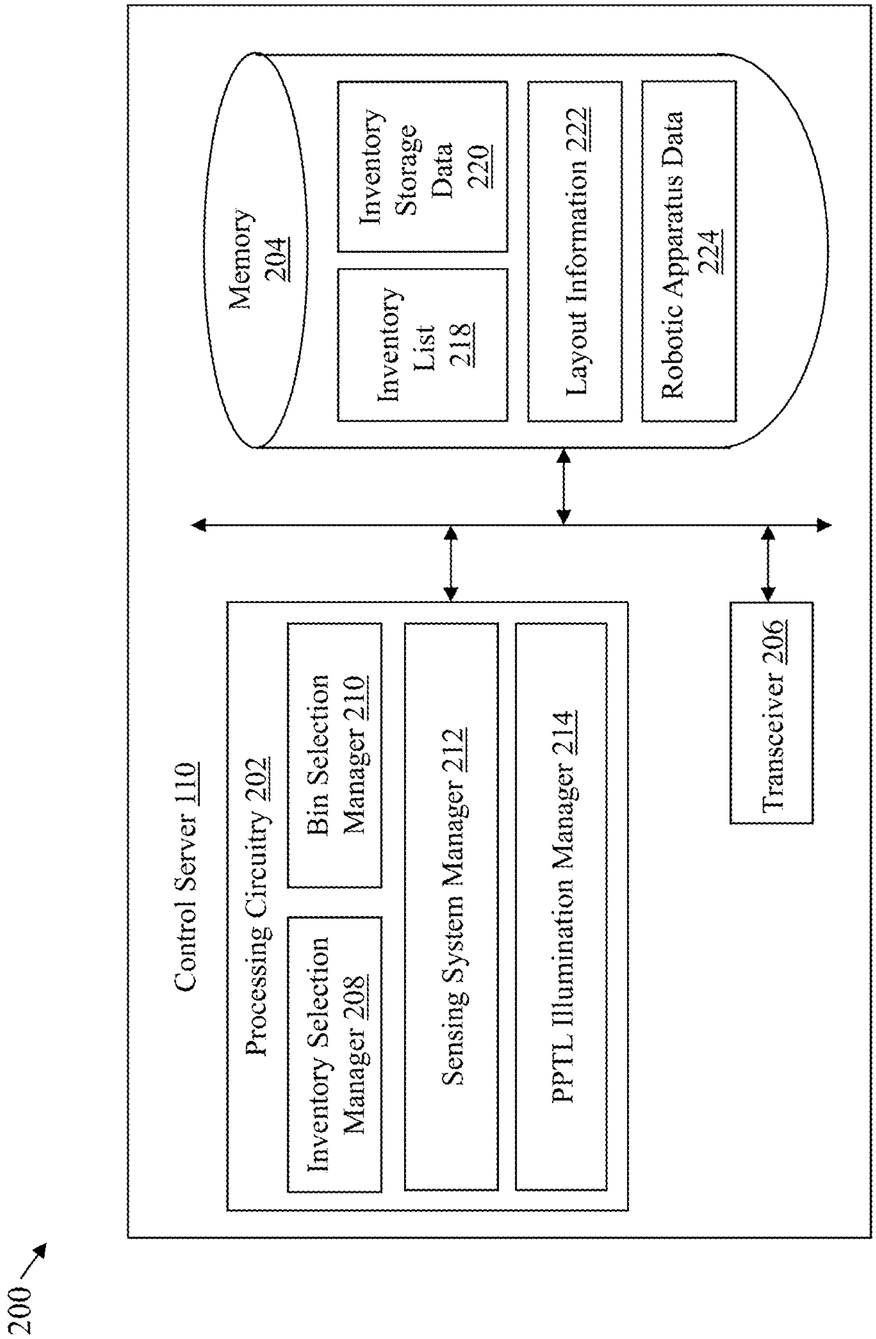
FIG. 2 is a block diagram that illustrates a control server, in accordance with an exemplary embodiment of the present disclosure.

FIG. 2 is a block diagram 200 that illustrates the control server 110, in accordance with an exemplary embodiment of the present disclosure. The control server 110 may include processing circuitry 202, a memory 204, and a transceiver 206. The processing circuitry 202 may include an inventory selection manager 208, a bin selection manager 210, a sensing system manager 212, and a PPTL illumination manager 214. It will be apparent to a person having ordinary skill in the art that the control server 110 is for illustrative purposes and not limited to any specific combination of hardware circuitry and/or software.

The processing circuitry 202 may execute and manage various operations (such as, selecting an inventory item to be moved from the plurality of storage units 106*a*-106*d*, generating activation signals, determining the bin of the plurality of bins for storing the selected inventory item, determining whether the placement of the selected inventory item is successful or unsuccessful based on the sensor signals, or the like) in the storage facility 102. The processing circuitry 202 may execute the operations using the inventory selection manager 208, the bin selection manager 210, the sensing system manager 212, and the PPTL illumination manager 214.

The inventory selection manager 208 may include suitable logic, instructions, circuitry, interfaces, and/or code for selecting inventory items for transfer in the storage facility 102. The inventory selection manager 208 may be configured to select a set of inventory items of the plurality of inventory items in the first storage unit 106*a*. The set of inventory items may be moved from the first storage unit 106*a* to a selected bin by the human operator 116*a* or the robotic operator 116*b*. The inventory selection manager 208 may determine the set of inventory items based on an order request received by the control server 110. The storage of the set of inventory items in the selected bin is based on several factors such as a size, shape, weight, and height of the set of inventory items. The inventory selection manager 208 may further create a queue of successive inventory items from the set of inventory items that are to undergo the pick-put operation. Further, the inventory selection manager 208 may be configured to provide the details of the selected inventory item to the operator device 122. The operator device 122 may be further configured to display the details of the selected inventory item to aid the human operator 116*a* or the robotic operator 116*b* to initiate the pick-put operation on the selected inventory item.

The bin selection manager 210 may include suitable logic, instructions, circuitry, interfaces, and/or code for facilitating the selection of a plurality of bins of the storage system 118 for the pick-put operation in the storage facility 102. The bin selection manager 210 may be further configured to manage the allocation of the plurality of bins to store the set of inventory items. For example, different inventory items in the plurality of storage units 106*a*-106*d* may have different shapes, sizes, and qualities. Therefore, the bin selection manager 210 may allocate the set of inventory items to a bin of the plurality of bins that may possess the required characteristics to accommodate the set of inventory items. Further, the bin selection manager 210 may track the number of inventory items in the selected bin as and when they are stored in the selected bin to ensure that all the inventory items from the set of inventory items are stored in the selected bin. Furthermore, the bin selection manager 210 may track the occupancy state of each bin of the plurality of bins. When the bin selection manager 210 determines that the set of inventory items is not placed in the selected bin, then the pick-put operation is determined to be unsuccessful.

The sensing system manager 212 may include suitable logic, instructions, circuitry, interfaces, and/or code for sensing the position of the inventory item which is selected for the pick-put operation in the storage facility 102. The sensing system manager 212 may be further configured to generate the activation signal to initiate the operation of the sensing system 120. The sensing system manager 212 further receives the first sensor signal from the sensing system 120. Based on the first sensor signal, the sensing system manager 212 may determine the first position of the inventory item and the second position of the hand of the human operator 116*a*. Further, the sensing system 120 may generate the second sensor signal. The sensing system manager 212 may be further configured to receive the second sensor signal from the sensing system 120. Based on the second sensor signal, the occupancy state of the selected bin and the presence of the hand of the human operator 116*a* in the vicinity of the selected bin may be determined by the sensing system manager 212.

The PPTL illumination manager 214 may include suitable logic, instructions, circuitry, interfaces, and/or code for providing the operator with the placement information of the selected inventory item. The PPTL illumination manager 214 may be configured to generate illumination signals and provide the illumination signal to the corresponding visual indicators. The visual indicators illuminate in the corresponding color providing required indications to the human operator 116*a*. For example, when an inventory item is to be placed in a selected bin, the PPTL illumination manager 214 may generate the first illumination signal. The first illumination signal may illuminate the visual indicator of the selected bin in the first color indicating the human operator 116*a* to place the inventory item in the selected bin. In another scenario, when the pick-put operation of the selected inventory item is successful, the PPTL illumination manager 214 may generate the second illumination signal. The second illumination signal may illuminate the visual indicator of the selected bin in the second color indicating to the human operator 116*a* that the pick-put operation of the selected inventory item is successful. In yet another scenario, when the pick-put operation of the inventory item is unsuccessful, the PPTL illumination manager 214 may generate the third illumination signal. The pick-put operation of the inventory item may be unsuccessful when the inventory item is placed in a bin other than the selected bin. The third illumination signal may illuminate the visual indicator of the other bin in the third color indicating to the human operator 116*a* that the pick-put operation of the inventory item is unsuccessful.

The memory 204 may include suitable logic, instructions, circuitry, and/or interfaces to store one or more instructions that are executed by entities such as the inventory selection manager 208, the bin selection manager 210, the sensing system manager 212, and the PPTL illumination manager 214 for performing one or more operations. Additionally, the memory 204 may be configured to store therein an inventory list 218, inventory storage data 220, layout information 222, and robotic apparatus data 224. Examples of the memory 204 may include a random access memory (RAM), a read only memory (ROM), a removable storage drive, a hard disk drive (HDD), a flash memory, a solid-state memory, and the like.

The inventory list 218 may include a list of inventory items and packages stored in the storage facility 102 and a number of units of each inventory item stored in the storage facility 102. In an example, the inventory list 218 may include items and packages such as cold storage items that may include soft drinks, fruit beverages, ice-creams, and the like. In another example, the inventory list 218 may further include items and packages such as toiletries, daily essentials, utensils, bags, grocery items, or the like.

The inventory storage data 220 is indicative of the storage locations of the inventory items stored in the plurality of storage units 106*a*-106*d*. For example, when an inventory item is stored in one of the plurality of storage units 106*a*-106*d*, the inventory item data is stored in the inventory storage data 220 based on the bin that it is stored in, the location of the bin in the storage system 118, and the location of the selected storage system in the warehouse facility. Similarly, when the inventory item is stored on the plurality of storage units 106*a*-106*d*, the inventory storage data 220 stores the location of the inventory item on the plurality of storage units 106*a*-106*d* and the location of the plurality of storage units 106*a*-106*d* in the warehouse facility. The inventory storage data 220 may further include the reference markers of the plurality of storage units 106*a*-106*d*. The reference identifiers are unique codes assigned to each of the plurality of storage units 106*a*-106*d*. In one example, the reference markers are radio frequency identification (RFID) tags that are readable by the robotic apparatus 108. Thus, based on the inventory storage data 220, the control server 110 is aware of the locations of all inventory items stored in the storage facility 102.

The layout information 222 may include information regarding the layout of the storage facility 102, such as location data of the plurality of storage units 106*a*-106*d* and the plurality of pick-put areas 114, or the like. The layout information 222 may further include real-time path availability information of various paths in the storage facility 102. For example, a first path in the storage facility 102 may be under maintenance, and hence may be unavailable for traversing.

The robotic apparatus data 224 may include information regarding the robotic apparatus present in the storage facility 102, such as the number of robotic apparatus 108, number of robotic apparatus that are in operation, an operation that is being carried out by each robotic apparatus, or the like. The robotic apparatus data 224 may further include real-time tracking of the operation being executed in various paths in the storage facility 102. For example, the first robotic apparatus 108*a* may be carrying the first storage unit 106*a* to the first pick-put area 114*a*.

The transceiver 206 may include suitable logic, instructions, circuitry, and/or interfaces to transmit and receive data over the communication network 112 using one or more communication network protocols. The transceiver 206 may transmit various messages and commands to the bin selection manager 210, the sensing system manager 212, and the PPTL illumination manager 214. The transceiver 206 may receive data from the robotic apparatus 108, the storage system 118, and the sensing system 120. Examples of the transceiver 206 may include, but are not limited to, an antenna, a radio frequency transceiver, a wireless transceiver, a Bluetooth transceiver, an ethernet-based transceiver, a universal serial bus (USB) transceiver, or any other device configured to transmit and receive data.

Though the processing circuitry 202 is depicted as a hardware component in FIG. 2, a person skilled in the art will appreciate that the scope of the disclosure is not limited to realizing the processing circuitry 202 as the hardware component. In another embodiment, the functionality of the processing circuitry 202 may be implemented by way of a computer-executable code or a set of computer-readable instructions stored in the memory 204, without deviating from the scope of the disclosure.

Figure 3A:
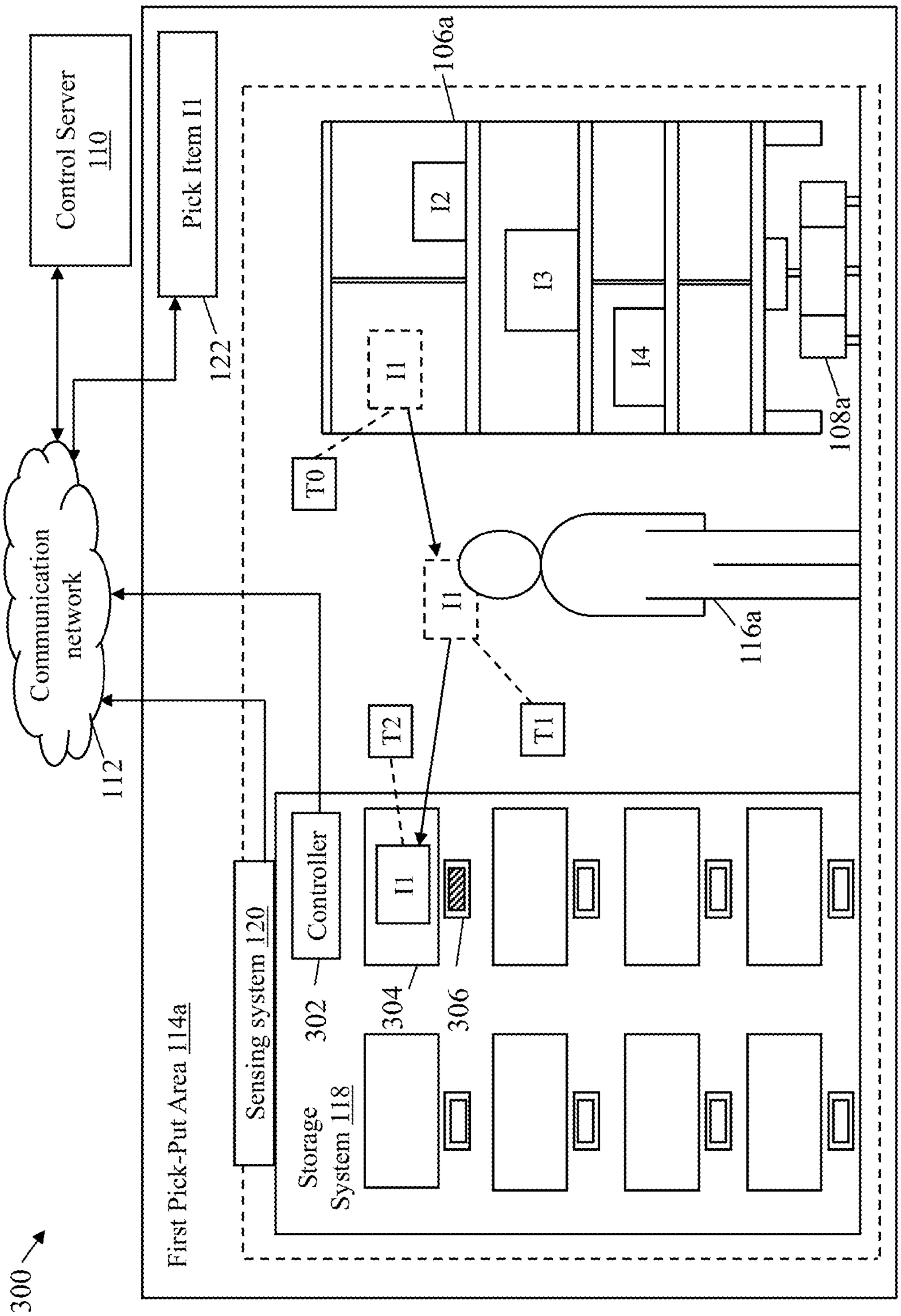
FIGS. 3A-3B represent a block diagram that illustrates a pick-put operation at the storage facility of FIG. 1, in accordance with an exemplary embodiment of the present disclosure.
Figure 3B:
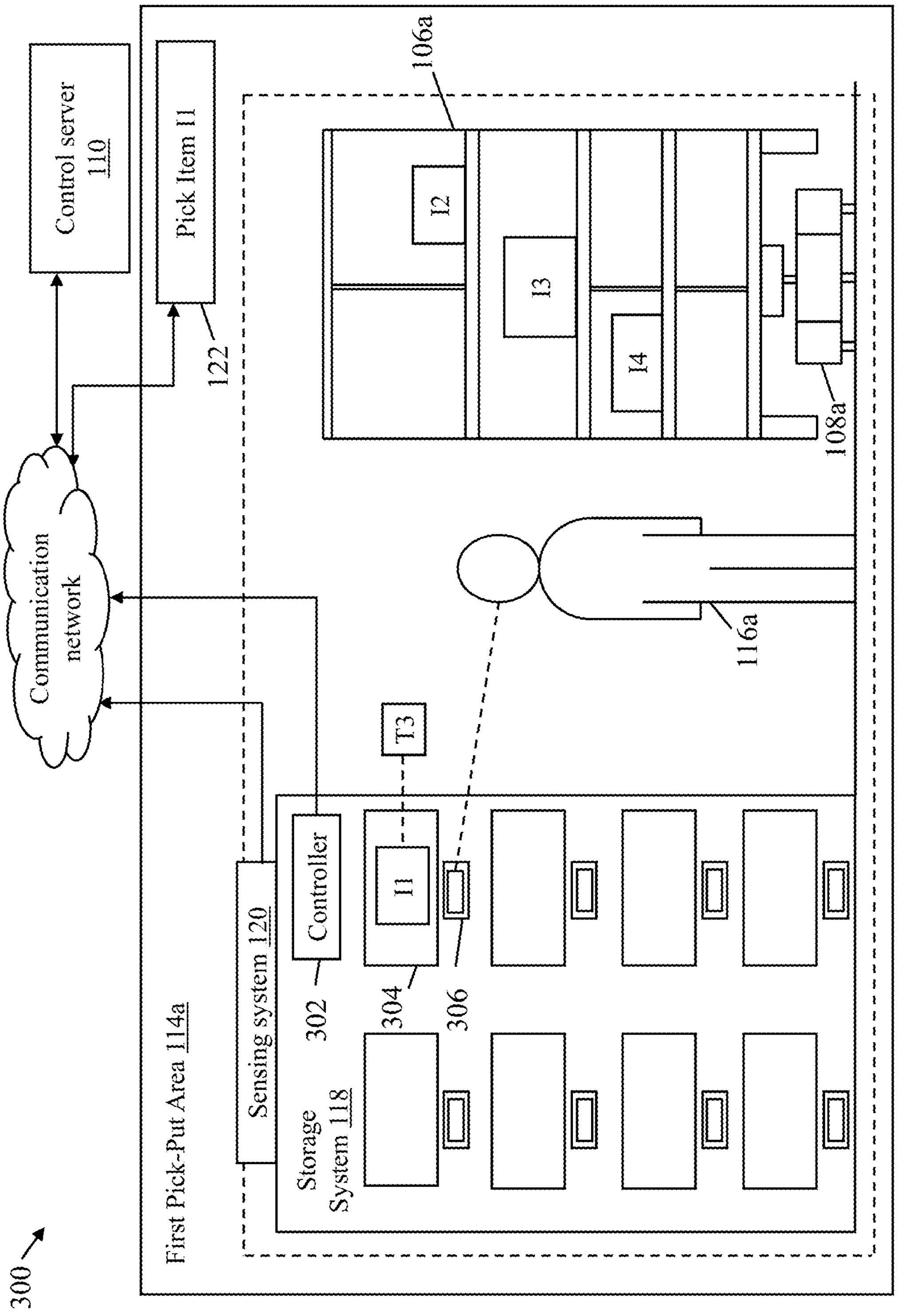

FIGS. 3A-3B represent a block diagram 300 that illustrates a pick-put operation at the storage facility 102 of FIG. 1, in accordance with an exemplary embodiment of the present disclosure. Referring now to FIG. 3A, a block diagram 300 that illustrates a pick operation at the storage facility 102, in accordance with an exemplary embodiment of the present disclosure is shown. The storage system 118 includes a controller 302, the plurality of bins that include a first bin 304, and the plurality of visual indicators that include a first visual indicator 306. The plurality of visual indicators are light based devices (i.e., PPTL-based devices). Examples of the plurality of visual indicators may include one of a light-emitting diode (LED), an organic light-emitting diode (OLED), a polymer light-emitting diode (PLED), and the like. Each visual indicator is configured to illuminate in one of the first color, the second color, and the third color based on a corresponding control signal received from the controller 302.

The controller 302 may include suitable logic, circuitry, interfaces, and/or code, executable by the circuitry, to control devices of the storage system 118 based on instructions received from the control server 110 by way of the communication network 112. In an example, the controller 302 is configured to generate a set of control signals based on at least one of the first illumination signal, the second illumination signal, and the third illumination signal. Examples of the controller 302 may include, but are not limited to, a microprocessor, an application-specific integrated circuit (ASIC) processor, a reduced instruction set computing (RISC) processor, a complex instruction set computing (CISC) processor, a field-programmable gate array (FPGA) processor, and the like.

The description below explains the pick-put operation for a single inventory item. In operation, the pick-put operation is to be performed on a first inventory item I1 that is placed in the first storage unit 106*a*. The first storage unit 106*a* further stores a second inventory item I2, a third inventory item I3, and a fourth inventory item I4 on corresponding shelves of the first storage unit 106*a*. The first robotic apparatus 108*a* thus travels to the storage area 104 to retrieve the first storage unit 106*a* and brings the first storage unit 106*a* to the first pick-put area 114*a* based on the instructions received from the control server 110. The control server 110 selects the first bin 304 for placement of the first inventory item I1. On selection of the first bin 304, the control server 110 generates the first illumination signal and the activation signal and transmits the first illumination signal and the activation signal to the controller 302 of the storage system 118 and the sensing system 120, respectively. The control server 110 further provides to the operator device 122, the placement information of the first item I1 indicating an operator such as the human operator 116*a* to place the first inventory item I1 in the first bin 304. In an example, the operator device 122 displays 'Pick Item I1' for the human operator 116*a*. Upon the arrival of the first robotic apparatus 108*a* with the first storage unit 106*a* at the first pick-put area 114*a*, the human operator 116*a* picks the first inventory item I1 at a first time instance 'T0' based on the instructions displayed on the operator device 122. The sensing system 120, affixed at the center of the topmost shelf of the storage system 118, activates based on the reception of the activation signal and generates the first sensor signal to indicate the first position of the first inventory item I1 and the second position of the hand of the human operator 116*a*. Although in the present disclosure the sensing system 120 may be situated at the center of the topmost shelf, in various embodiments, the sensing system 120 may be situated elsewhere.

The first position of the inventory item is at the first shelf of the first storage unit 106*a*. Further, the human operator 116*a* moves their hand to pick up the first inventory item I1 from the first shelf of the first robotic apparatus 108*a*. Therefore, the second position of the hand of the human operator 116*a* is on the first shelf of the first storage unit 106*a*. Further, the control server 110 may receive the first sensor signal at a second time instance 'T1', and determine whether the first position and the second position are the same. The control server 110 may further detect that the pick-put operation is being implemented on the first inventory item I1 based on the first position and the second position being the same position.

The control server 110 further receives the second sensor signal at predetermined time intervals such as at the first time instance 'T0' and the second time instance 'T1'. The second sensor signal at each of the first time instance 'T0' and the second time instance 'T1' indicates to the control server 110 that the occupancy state of the first bin 304 is empty. The second sensor signal at the first time instance 'T0' and the second time instance 'T i' further indicates the absence of the hand of the human operator 116*a* in the vicinity of the first bin 304 at each of the first time instance 'T0' and the second time instance 'T1'.

The controller 302 further generates the first control signal to illuminate the first visual indicator 306 in the first color based on the first illumination signal thereby indicating the human operator 116*a* to place the first inventory item I1 in the first bin 304. In an example, the first color is blue. Based on the illumination of the first visual indicator 306 in blue, the human operator 116*a* places the first inventory item I1 in the first bin 304 at a third time instance 'T2'. The sensing system 120 senses the change of occupancy state of the first bin 304 and the presence of the hand of the human operator 116*a* in the vicinity of the first bin 304, and provides the second sensor signal to the control server 110 at the third time instance 'T2'. The second sensor signal at the third time instance 'T2' indicates the presence of the hand of the human operator 116*a* in the vicinity of the first bin 304 and the change in the occupancy state of the first bin 304 at the third time instance 'T2'.

Referring now to FIG. 3B, a block diagram 300 that illustrates the success of the pick-put operation of the first inventory item I1 in the storage system 118 in accordance with an embodiment of the present disclosure is shown. The control server 110 receives the second sensor signal and determines the presence of the hand of the human operator 116*a* in the vicinity of the first bin 304 and that the occupancy state of the first bin 304 has changed from an empty state to an occupied state. The control server 110 thus determines that the pick-put operation of the first inventory item I1 is successful. The control server 110 generates and transmits the second illumination signal based on the determination that the pick-put operation of the first inventory item I1 is successful, to the controller 302. The controller 302 thus provides a second control signal to the first visual indicator 306. Based on the second control signal, the first visual indicator 306 illuminates in the second color indicating to the human operator 116*a* that the pick-put operation of the first inventory item I1 is successful. In an example, the second color is green. Thus, the need for the human operator 116*a* to press the button associated with the corresponding bin for indicating the pick-up of the inventory item is eliminated.

Though the pick-put operation for a single inventory item such as the first inventory item I1 is explained, it will be understood that a similar operation is executed for placing multiple inventory items in the first bin 304. In such a scenario, the pick-put operation of multiple inventory items is successful when all the inventory items are placed in the first bin 304. Further, it will be understood by a person skilled in the art that for multiple inventory items, a single inventory item is picked at a time, and the pick-put operation is executed for each remaining inventory item of the multiple inventory items in a similar manner.

FIGS. 4A-4B represent a block diagram 400 that illustrates another pick-put operation at the storage facility 102 of FIG. 1, in accordance with an exemplary embodiment of the present disclosure. Referring now to FIG. 4A, the block diagram 400 illustrating an unsuccessful pick-put operation at the first pick-put area 114*a*, in accordance with an exemplary embodiment of the present disclosure is shown.

In operation, the pick-put operation is to be performed on the second inventory item I2 that is placed in the first storage unit 106*a*. The pick-put operation is to be performed on the second inventory item I2 after the pick-put operation on the first inventory item I1 is performed. The control server 110 selects a second bin 402 of the storage system 118 for storage of the second inventory item I2 in the second bin 402. On selecting the second bin 402, the control server 110 generates the first illumination signal and the activation signal and transmits the first illumination signal and the activation signal to the controller 302 of the storage system 118 and the sensing system 120, respectively. The control server 110 further provides to the operator device 122, the placement information of the second inventory item I2 indicating the human operator 116*a* to place the second inventory item I2 in the second bin 402. Thus, the operator device 122 displays 'Pick Item I2'. The human operator 116*a* picks the second inventory item I2 at a fourth time instance 'T3' based on the instructions displayed on the operator device 122. The sensing system 120 generates and transmits the first sensor signal at a fifth time instance 'T4'. Based on the first sensor signal, the control server 110 determines whether the first position of the second inventory item I2 and the second position of the hand of the human operator 116*a* are the same. When the first position and the second position are the same, the control server 110 detects that the pick-put operation is being performed on the second inventory item I2.

The control server 110 further receives the second sensor signal at the fourth time instance 'T3' and the fifth time instance 'T4'. The second sensor signal at the fourth time instance 'T3' and the fifth time instance 'T4' indicate the control server 110 that the occupancy state of the second bin 402 is empty. The second sensor signal at the fourth time instance 'T3' and the fifth time instance 'T4' further indicates the control server 110 about the absence of the hand of the human operator 116*a* in the vicinity of the second bin 402 at the time instances 'T3' and 'T4'.

The controller 302 further illuminates a second visual indicator 404 in the first color based on the first illumination signal to indicate the human operator 116*a* to place the second inventory item I2 in the second bin 402. In a scenario, the human operator 116*a* erroneously places the second inventory item I2 in the first bin 304 at a sixth time instance 'T5'. To generate the second sensor signal, the sensing system 120 senses the change of occupancy state of the first bin 304, the hand of the human operator 116*a* in the vicinity of the first bin 304, and further senses that the occupancy state of the second bin 402 is unchanged. The sensing system 120 thus provides the second sensor signal to the control server 110 at the sixth time instance 'T5'. The second sensor signal at the sixth time instance 'T5' indicates to the control server 110 that the occupancy state of the first bin 304 is changed. The second sensor signal at the sixth time instance 'T5' further indicates to the control server 110 that the hand of the human operator 116*a* is present in the vicinity of the first bin 304 at the sixth time instance 'T5'. The control server 110 receives the second sensor signal and determines that the occupancy state of the first bin 304 has changed from an empty state to an occupied state and the occupancy state of the second bin 402 is unchanged. The control server 110 thus determines that the pick-put operation of the second inventory item I2 is unsuccessful.

Referring now to FIG. 4B, the block diagram 400 illustrating the correction of the pick-put operation of the second inventory item I2 in the storage system 118, in accordance with an exemplary embodiment of the present disclosure is shown. To correct the failure of the pick-put operation of the second inventory item I2, the control server 110 generates and transmits the third illumination signal based on the determination that the pick-put operation of the second inventory item I2 is unsuccessful, to the controller 302. The controller 302 thus provides a third control signal to the first visual indicator 306. Based on the third control signal, the first visual indicator 306 illuminates in the third color indicating to the human operator 116*a* that the pick-put operation of the second inventory item I2 is unsuccessful, i.e., the second inventory item I2 is incorrectly stored in the first bin 304. In an example, the third color is red.

The controller 302 provides the first control signal to the second visual indicator 404 thereby indicating the human operator 116*a* to store the second inventory item I2 in the second bin 402. The human operator 116*a* thus removes the second inventory item I2 from the first bin 304 at a seventh time instance 'T6' and stores the second inventory item I2 in the second bin 402 at an eighth time instance 'T7'. The sensing system 120 senses the change of occupancy state of the first bin 304 and the second bin 402, and the presence of the hand of the human operator 116*a* in the vicinity of the second bin 402 prior to the change in the state of the second bin 402, and provides the second sensor signal to the control server 110 at the seventh time instance 'T6' and the eighth time instance 'T7'. The second sensor signal at the seventh time instance 'T6' and the eighth time instance 'T7' indicates the change in the occupancy state of the second bin 402. The second sensor signal at the seventh time instance 'T6' and the eighth time instance 'T7' further indicates the presence of the hand of the human operator 116*a* in the vicinity of the second bin 402. The control server 110 receives the second sensor signal and determines that the occupancy state of the first bin 304 has changed from an occupied state to an empty state, and the occupancy state of the second bin 402 has changed from an empty state to an occupied state. The control server 110 thus determines that the pick-put operation of the second inventory item I2 is successful. The control server 110 generates and transmits the second illumination signal and a turn-off signal based on the determination that the pick-put operation of the second inventory item I2 is successful, to the controller 302. The controller 302 thus provides the second control signal to the second visual indicator 404, and a fourth control signal to the first visual indicator 306. The fourth control signal is generated by the controller 302 based on the fourth illumination signal. Based on the second control signal, the second visual indicator 404 illuminates in a second color indicating to the human operator 116*a* that the pick-put operation of the second inventory item I2 is successful. Based on the fourth control signal, the first visual indicator 306 stops illuminating.

Figure 5:
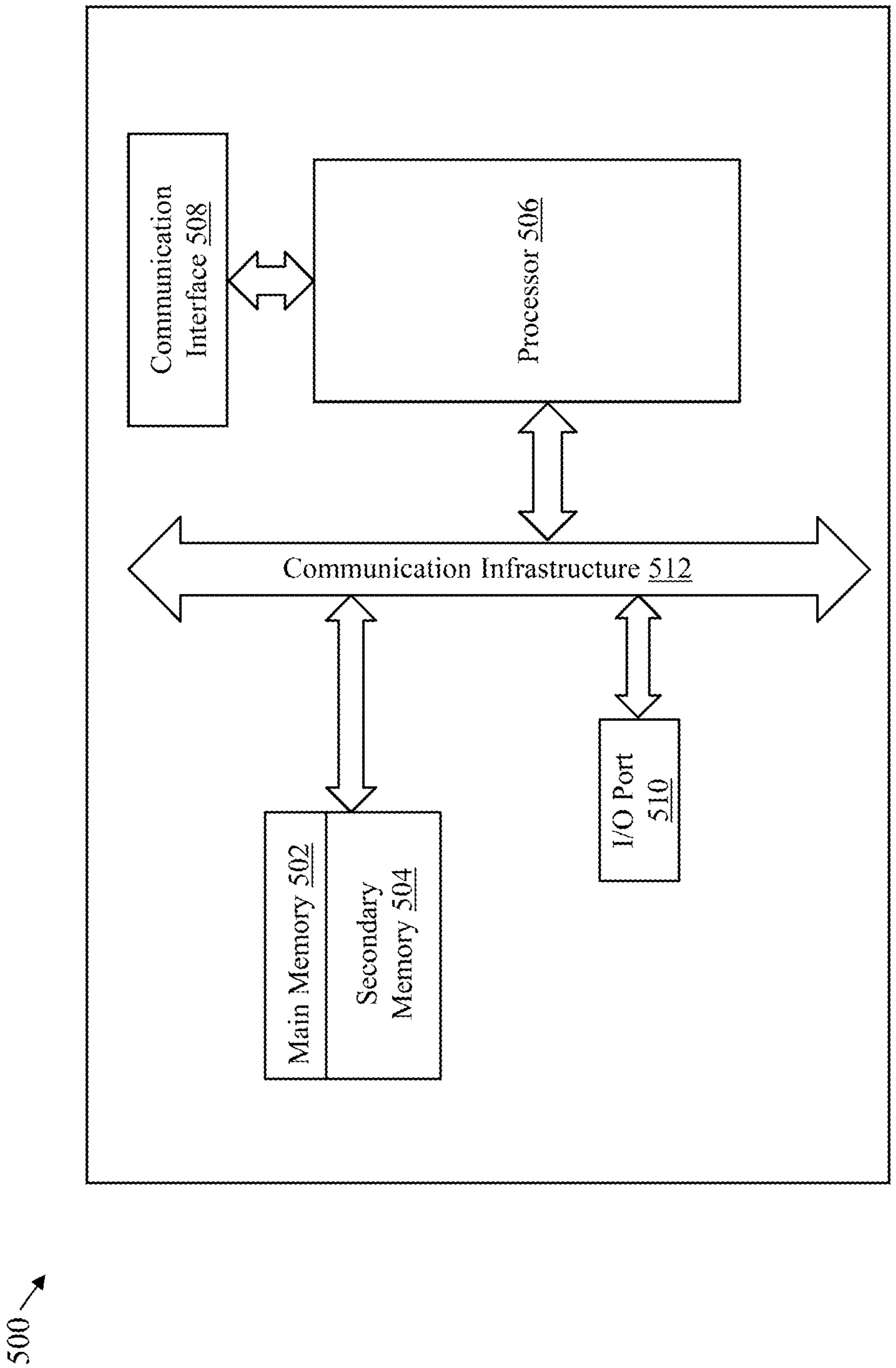
FIG. 5 is a block diagram that illustrates a system architecture of a computer system to facilitate item transfer in the storage facility of FIG. 1, in accordance with an exemplary embodiment of the present disclosure.

FIG. 5 is a block diagram that illustrates a system architecture of a computer system 500 to facilitate item transfer in the storage facility 102, in accordance with an exemplary embodiment of the present disclosure. An embodiment of the disclosure, or portions thereof, may be implemented as computer-readable code on the computer system 500. In one example, the control server 110 of FIG. 1 may be implemented in the computer system 500 using hardware, software, firmware, non-transitory computer-readable media having instructions stored thereon, or a combination thereof and may be implemented in one or more computer systems or other processing systems. Hardware, software, or any combination thereof may embody modules and components used to implement the methods of FIGS. 3 and 4. The computer system 500 may include a main memory 502, a secondary memory 504, a processor 506, a communication interface 508, an input/output (I/O) port 510, and a communication infrastructure 512.

Examples of the main memory 502 may include a random access memory (RAM), a read-only memory (ROM), and the like. The secondary memory 504 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage drive may be a non-transitory computer-readable recording media.

The processor 506 may be a special purpose or a general-purpose processing device. The processor 506 may be a single processor or multiple processors. The processor 506 may have one or more processor "cores." Further, the processor 506 may be coupled to the communication interface 508 such as a bus, a bridge, a message queue, the communication network 112, multi-core message-passing scheme, or the like.

The I/O port 510 may include various input and output devices that are configured to communicate with the processor 506. Examples of the input devices may include a keyboard, a mouse, a joystick, a touchscreen, a microphone, and the like. Examples of the output devices may include a display screen, a speaker, headphones, and the like. The communication infrastructure 512 may be configured to allow data to be transferred between the computer system 500 and various devices that are communicatively coupled to the computer system 500. Examples of the communication infrastructure 512 may include a modem, a network interface, i.e., an Ethernet card, a communication port, and the like. Data transferred via the communication infrastructure 512 may be signals, such as electronic, electromagnetic, optical, or other signals as will be apparent to a person skilled in the art. The signals may travel via a communications channel, such as the communication network 112, which may be configured to transmit the signals to the various devices that are communicatively coupled to the computer system 500. Examples of the communication channel may include a wired, wireless, and/or optical medium such as cable, fiber optics, a phone line, a cellular phone link, a radio frequency link, and the like. The main memory 502 and the secondary memory 504 may refer to non-transitory computer-readable mediums that may provide data that enables the computer system 500 to implement the method illustrated in FIGS. 3 and 4.

FIGS. 6A-6D represent a flow chart 600 that illustrates a method (i.e., a process) to facilitate item transfer in the storage facility 102, in accordance with an exemplary embodiment of the present disclosure.

Figure 6A:
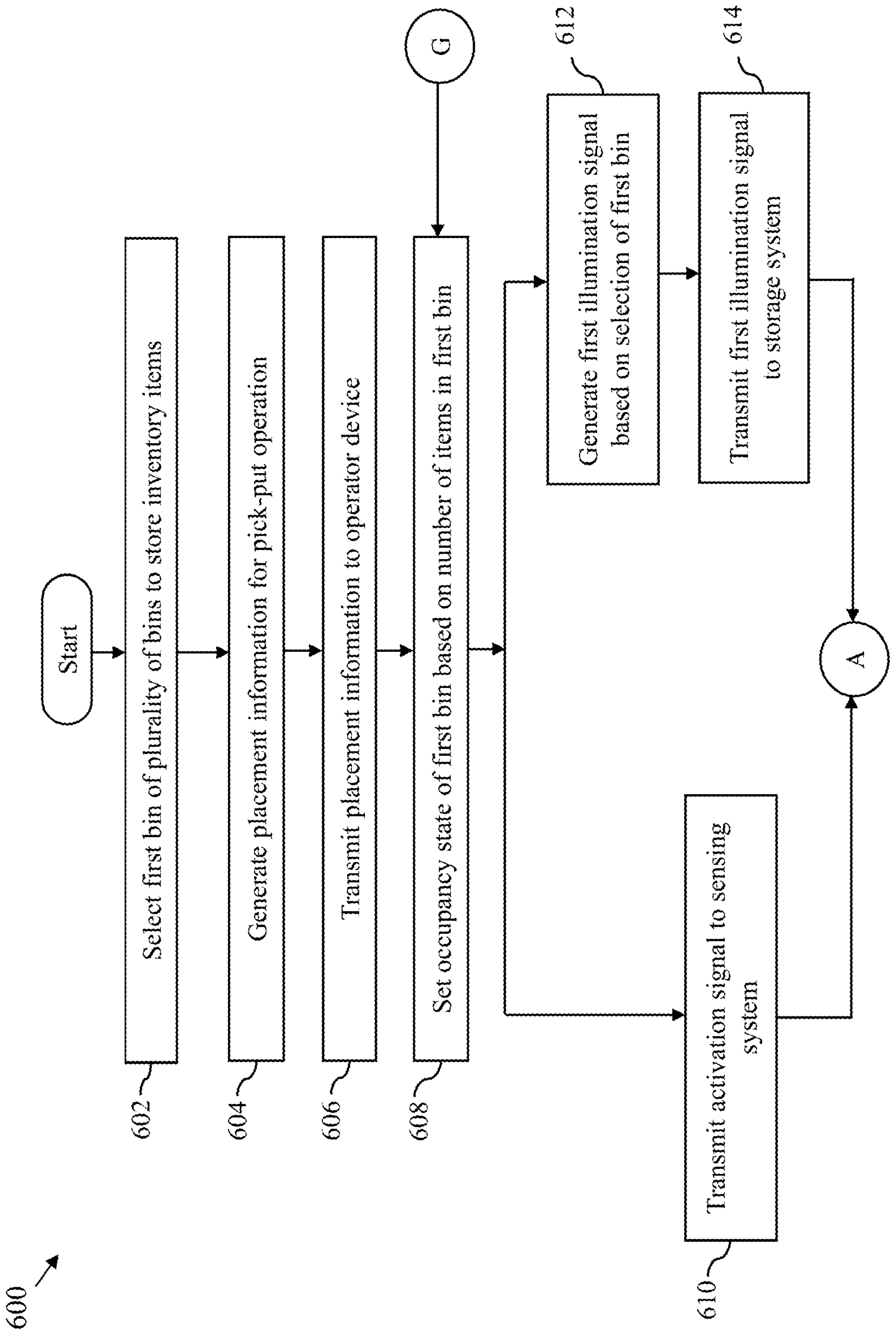
FIGS. 6A-6D represent a flow chart that illustrates a method to facilitate item transfer in the storage facility of FIG. 1, in accordance with an exemplary embodiment of the present disclosure.

Referring now to FIG. 6A, the process may generally start at step 602, the control server 110 may select the first bin 304 of the plurality of bins to store a set of inventory items. The first inventory item I1 may be included in the set of inventory items. At step 604, the control server 110 may generate the placement information for the pick-put operation. The placement information may indicate that the set of inventory items is to be stored in the first bin 304 based on the selection of the first bin 304. At step 606, the control server 110 may transmit the placement information of the set of inventory items to the operator device 122 such that the pick-put operation is performed on the set of inventory items based on the placement information. The operator device 122 may display the details (e.g., the image or identifier) of the set of inventory items to one of the human operator 116*a* or the robotic operator 116*b* who is assigned to perform the pick-put operation. For the sake of ongoing discussion, it is assumed that the human operator 116*a* is assigned to perform the pick-put operation. Further, at step 608, the control server 110 may set the occupancy state of the first bin 304 based on the number of items in the first bin 304. For example, if the first bin 304 is empty, the control server 110 may set the occupancy state of the first bin 304 as null. At step 610, the control server 110 may transmit the activation signal to the sensing system 120. The sensing system 120 may receive the activation signal and based on the activation signal, the sensing system 120 is activated. Further, the initiation of the pick-put operation is sensed by the sensing system 120 when the human operator 116*a* picks a selected inventory item from the set of inventory items for the pick-put operation. Concurrently, at step 612, the control server 110 may also generate the first illumination signal based on the selection of the first bin 304. At step 614, the control server 110 may transmit the first illumination signal to the storage system 118. The storage system 118 may be the pick-put-to-light (PPTL)-based system. In other words, the control server 110 may transmit the first illumination signal to the controller 302 of the storage system 118, i.e., the PPTL-based system. The storage system 118 may be such that the first visual indicator 306 is mapped to the first bin 304, and the second visual indicator 404 is mapped to the second bin 402. Based on the first illumination signal, the first visual indicator 306 may illuminate in the first color to set the first bin 304 as a target for the pick-put operation of the first inventory.

Figure 6B:
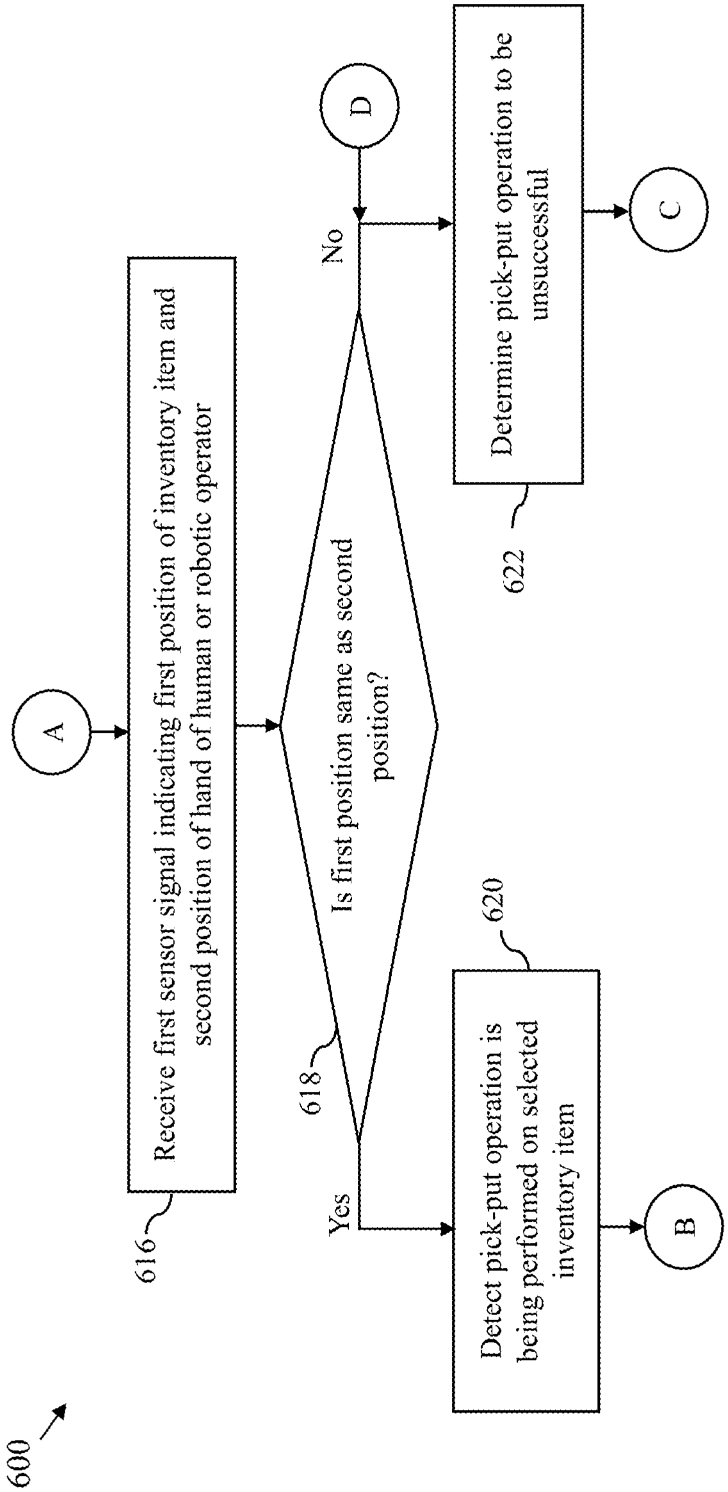

Referring now to FIG. 6B, at step 616, the control server 110 may receive the first sensor signal from the sensing system 120. The first sensor signal may indicate the first position of the selected inventory item and the second position of the hand of the human operator 116*a* who is assigned to execute the pick-put operation on the selected inventory item. Further, at step 618, based on the first sensor signal, the control server 110 may determine whether the first position of the selected inventory item and the second position of the hand of the human operator 116*a* are the same. If at step 618, the control server 110 determines that the first position and the second position are the same, the process proceeds to step 620. At step 620, the control server 110 may detect that the pick-put operation is being performed on the selected inventory item based on the first position and the second position being the same. If at step 618, the control server 110 determines that the first position and the second position are not the same, the process proceeds to step 622. At step 622, based on the difference in the first position and the second position, the control server 110 may determine that the pick-put operation is unsuccessful.

Figure 6C:
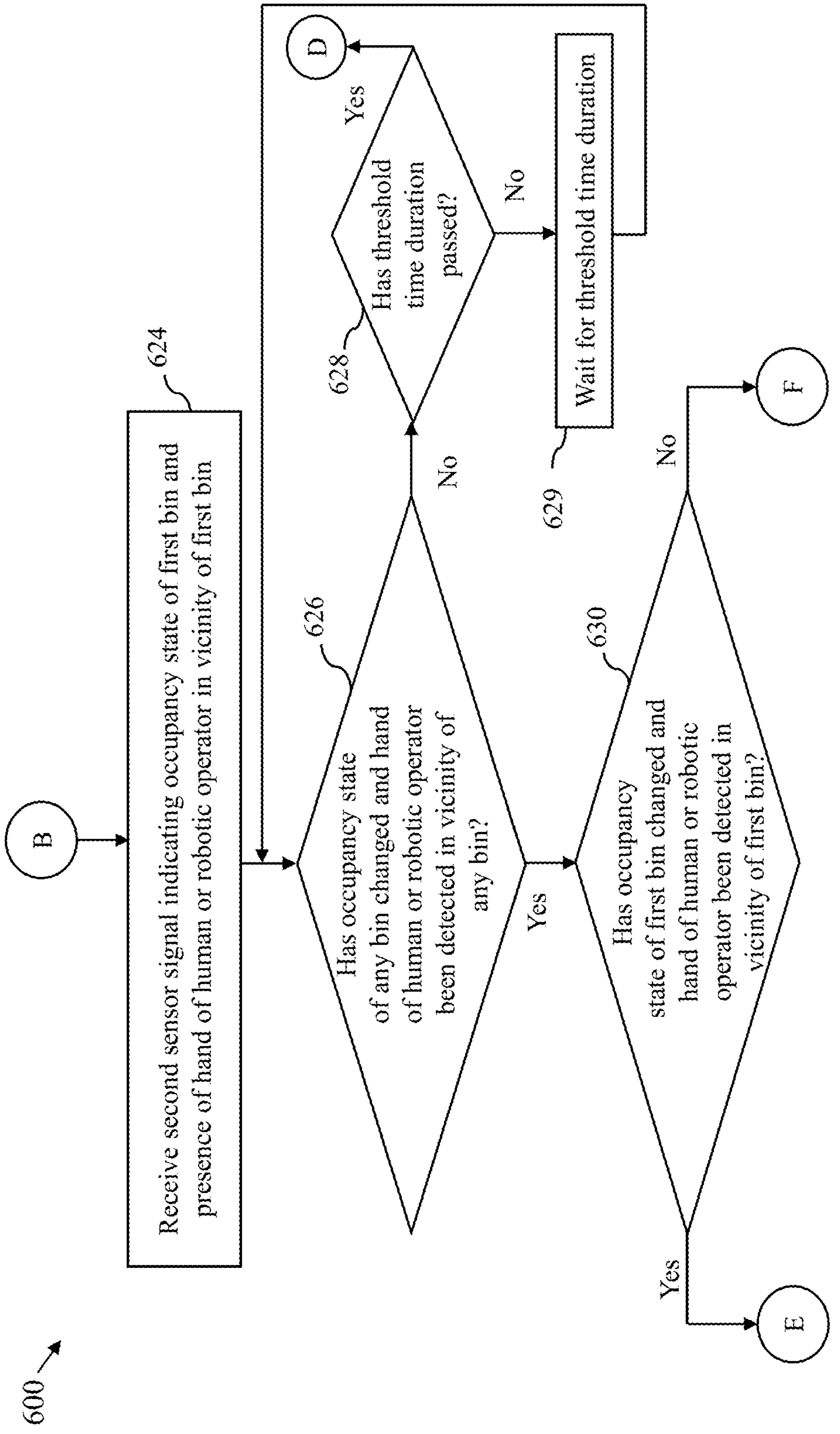

Referring now to FIG. 6C, at step 624, the control server 110 may receive the second sensor signal from the sensing system 120 at pre-determined time intervals. The second sensor signal indicates the occupancy state of the first bin 304 and the presence of the hand of the human operator 116*a* in the vicinity of the plurality of bins. Alternatively stated, the second sensor signal indicates the presence of the hand of human operator 116*a* based on an obstruction detected by the sensing system 120 in the vicinity of any of the plurality of bins. At step 626, the control server 110 detects whether the occupancy state of any of the bins in the plurality of bins has changed and whether the hand of the human operator 116*a* is in the vicinity of any of the plurality of bins. If at step 626, the control server 110 detects that the occupancy state of one of the bins is unchanged and does not detect the presence of the hand of the human operator 116*a* in the vicinity of the corresponding bin, then the process moves to step 628. At step 628, the control server 110 may determine whether the threshold time duration has passed. If at step 628, the control server 110 determines that the threshold time duration has not passed, step 629 is executed. At step 629, the control server 110 waits for a threshold time duration and the process moves to step 626. However, if at step 628, the control server 110 determines that the threshold time duration has passed, step 622 is executed. If at step 626, the control server 110 detects that the occupancy state of one of the bins has changed and if the control server 110 detects the presence of the hand of the human operator 116*a* in the vicinity of the corresponding bin, then the process moves to step 630. At step 630, the control server 110 may detect the change in the occupancy state of the first bin 304 and the control server 110 may further detect the presence or absence of the hand of the human operator 116*a* in the vicinity of the first bin 304.

Figure 6D:
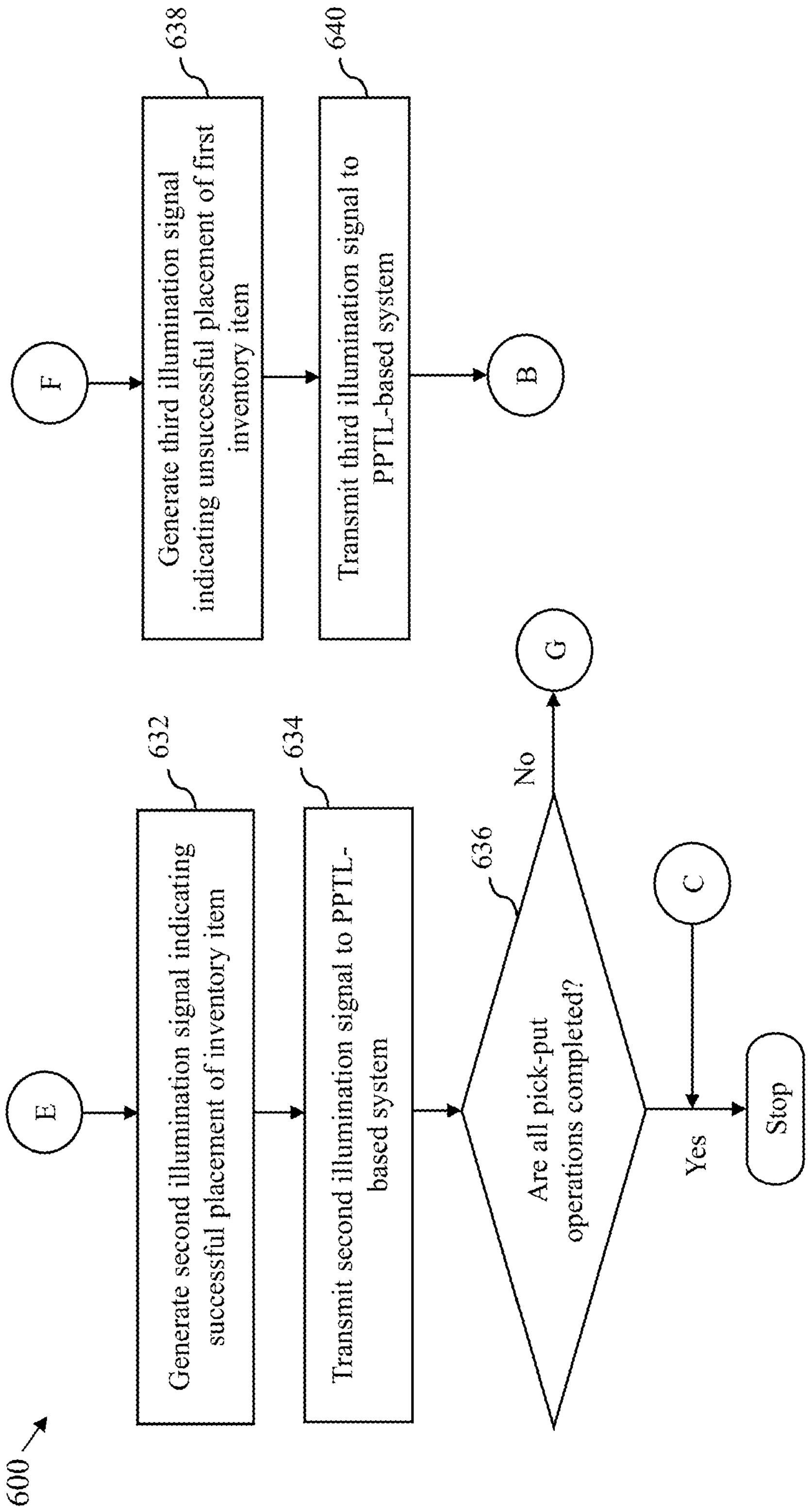

Referring now to FIG. 6D, if at step 630, the control server 110 determines that the occupancy state of the first bin 304 has changed and the hand of the human operator 116*a* is present in the vicinity of the first bin 304, the pick-put operation is determined to be successful, and the process proceeds to step 632. At step 632, the control server 110 may generate the second illumination signal indicating the successful placement of the selected inventory item in the first bin 304. The pick-put operation of the selected inventory item is determined to be successful based on the detection that the occupancy state of the first bin 304 is changed and the hand of the human operator 116*a* is detected to be present in the vicinity of the first bin 304. Further, at step 634, the control server 110 may transmit the second illumination signal to the storage system 118, i.e., the PPTL-based system. In other words, the control server 110 may transmit the second illumination signal to the controller 302 corresponding to the PPTL-based system. The PPTL-based system may receive the second illumination signal and illuminate the first visual indicator 306 in the second color. Illumination of the first visual indicator 306 in the second color is an acknowledgment for a successful completion of the pick-put operation to the human operator 116*a*. Further at step 636, the control server 110 verifies whether all the pick-put operations are completed. If at step 636, the control server 110 determines that all the pick-put operations are completed, then the system comes to halt. For example, if the number of set of inventory items for the pick-put operation is three, then the control server 110 checks whether the pick-put operation for three inventory items is completed. If the control server 110 determines that the three pick-put operations are completed, then the process comes to halt. However, if at step 636, the control server 110 determines that pick-put operations of the remaining inventory items are incomplete, then the process proceeds to step 608 to complete the pick-put operation for the remaining inventory items.

If at step 630, the control server 110 determines that the occupancy state of the first bin 304 remains unchanged and the occupancy state of another bin has changed, and the hand of the human operator 116*a* is present in the vicinity of another bin, then the process proceeds to step 638. For the sake of simplicity, the other bin in which the selected inventory item is incorrectly placed is assumed to be the second bin 402. At step 638, the control server 110 generates the third illumination signal indicating the unsuccessful placement of the selected inventory item. In other words, the control server 110 generates the third illumination signal when the pick-put operation of the selected inventory item is determined to be unsuccessful based on the detection that the occupancy state of the first bin 304 is unchanged and the occupancy state of the second bin 402 is changed. Further, the pick-put operation of the selected inventory item is determined to be unsuccessful based on the detection that the occupancy state of the first bin 304 is unchanged and the occupancy state of the second bin 402 of the plurality of bins has changed or the hand of the human operator 116*a* is detected to be present in the vicinity of the second bin 402 instead of the first bin 304. The process proceeds to step 640, where the control server 110 transmits the third illumination signal to the PPTL-based system. In other words, the control server 110 transmits the third illumination signal to the controller 302 corresponding to the PPTL-based system. Based on the reception of the third illumination signal by the PPTL-based system, the visual indicator corresponding to the second bin 402 may be illuminated in the third color to indicate that the selected inventory item is incorrectly placed in the second bin 402 after the pick-put operation. Based on the illumination of the corresponding visual indicator in the third color, the human operator 116*a* may determine that the placement of the inventory item is unsuccessful. In other words, the human operator 116*a* may determine that the inventory item is incorrectly placed. The process then moves to step 626 to correct the pick-put operation.

The disclosed embodiments encompass numerous advantages. Exemplary advantages of the disclosed methods include, but are not limited to a system and method to facilitate item transfer in a storage facility 102. The disclosed methods and system offer a solution where the operators are not required to manually scan the inventory item or hold any scanning apparatus prior to placing it in the corresponding bin and the operators are further not required to press a button to indicate the completion of the pick-put operation. Therefore, the disclosed methods and systems significantly reduce a time required for processing an order and increase the reliability of the system. Consequently, the disclosed methods and systems increase the throughput of the storage facility 102. Further, the disclosed methods and systems significantly reduce the inconvenience caused to operators in the storage facility 102 to remember to scan an inventory item or press a button after placing the inventory item in the corresponding bin. Thus, the disclosed methods and systems significantly reduce the chances of human errors during pick-put operations of orders. Since the pick-put operations of inventory items are automated by the control server 110 using the sensing system 120, a likelihood of an incorrect order or items being presented to a user is eliminated. The disclosed methods and systems enable automated handling of inventory items without having to make any significant change to the existing infrastructure of the storage facility 102. Hence, the disclosed methods and systems are cost-efficient and provide an optimal solution for hassle-free handling of the inventory items.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features a method and system for transferring inventory items in the storage facility 102. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the width or scope.

The invention claimed is:

1. A method to facilitate item transfer in a storage facility, the method comprising:

selecting, by a control server, a first bin of a plurality of bins of a storage system to store a first inventory item, wherein the storage system is located in the storage facility;

receiving, by the control server, from a sensing system, based on the selection of the first bin, a first sensor signal indicating a first position of the first inventory item and a second position of a hand of an operator who is assigned to execute a pick-put operation on the first inventory item;

detecting, by the control server, that the pick-put operation is being performed on the first inventory item based on the first sensor signal indicating that the first position and the second position are same;

receiving, by the control server from the sensing system, a second sensor signal at predetermined time intervals, wherein the second sensor signal further indicates an occupancy state of each of the plurality of bins and a presence of the hand of the operator in vicinity of any of the plurality of bins;

detecting, by the control server, based on the second sensor signal, whether the occupancy state of any of the plurality of bins is changed and whether the hand of the operator is present in the vicinity of any of the plurality of bins; and determining, by the control server, whether the pick-put operation of the first inventory item is successful or unsuccessful based on the detection that the occupancy state of any of the plurality of bins has changed and the hand of the operator is present in the vicinity of any of the plurality of bins, wherein the operator is one of a human operator or a robotic operator, the sensing system is a light detection and ranging (LiDAR) system that is:

mounted externally to the plurality of bins, configured to change position, configured to generate the first sensor signal and the second sensor signal, and configured to sense both of a human operator and a robotic operator, wherein the second sensor signal that is generated by the sensing system and transmitted to the control server indicates a presence of the hand of the operator based on an obstruction detected by the sensing system in the vicinity of any of the plurality of bins.

2. The method of claim 1, further comprising:

generating, by the control server, placement information indicating that the first inventory item is to be stored in the first bin based on the selection of the first bin; and transmitting, by the control server to an operator device, the placement information, wherein the pick-put operation is performed on the first inventory item based on the placement information.

3. The method of claim 1, wherein the storage system is a pick-put to light (PPTL)-based system, and wherein a first visual indicator of the PPTL-based system is mapped to the first bin, and a second visual indicator of the PPTL-based system is mapped to a second bin.

4. The method of claim 3, further comprising:

generating, by the control server, a first illumination signal, based on the selection of the first bin; and transmitting, by the control server, the first illumination signal, to the PPTL-based system, wherein based on the first illumination signal, the first visual indicator illuminates in a first color to set the first bin as a target for the pick-put operation of the first inventory item.

5. The method of claim 4, further comprising transmitting, by the control server, an activation signal to the sensing system concurrently with the first illumination signal, wherein based on the activation signal, the sensing system is activated.

6. The method of claim 4, further comprising:

generating, by the control server, a second illumination signal based on the determination that the pick-put operation of the first inventory item is successful, wherein the pick-put operation of the first inventory item is determined to be successful based on the detection that the occupancy state of the first bin is changed and the hand of the operator is detected to be present in the vicinity of the first bin; and transmitting, by the control server, the second illumination signal to the PPTL-based system.

7. The method of claim 6, wherein based on the second illumination signal, the first visual indicator illuminates in a second color as an acknowledgment for a successful completion of the pick-put operation.

8. The method of claim 3, wherein the pick-put operation of the first inventory item is determined to be unsuccessful based on the detection that at least one of (i) the occupancy state of the first bin is unchanged and the occupancy state of the second bin of the plurality of bins has changed or (ii) the hand of the operator is detected to be present in the vicinity of the second bin instead of the first bin.

9. The method of claim 8, further comprising:

generating, by the control server, a third illumination signal, when the pick-put operation of the first inventory item is determined to be unsuccessful based on the detection that the occupancy state of the first bin is unchanged and the occupancy state of the second bin is changed; and transmitting, by the control server, the third illumination signal, to the PPTL-based system, wherein based on the third illumination signal, the second visual indicator illuminates in a third color to indicate that the first inventory item is incorrectly stored in the second bin after the pick-put operation.

10. The method of claim 1, wherein the pick-put operation of the first inventory item is determined to be unsuccessful based on the detection that at least one of (i) the occupancy state of the first bin remains unchanged after a threshold time duration or (ii) the hand of the operator is not detected in the vicinity of the first bin within the threshold time duration.

11. A system to facilitate item transfer in a storage facility, the system comprising:

a storage system comprising a plurality of bins, wherein the storage system is located in the storage facility;

a sensing system, wherein the sensing system is configured to generate a first sensor signal and a second sensor signal, and wherein the first sensor signal indicates a first position of a first inventory item and a second position of a hand of an operator who is assigned to execute a pick-put operation on the first inventory item, and the second sensor signal indicates an occupancy state of each of the plurality of bins and the hand of the operator in vicinity of the plurality of bins; and a control server that communicates with the sensing system and the storage system, wherein the control server is configured to:

select a first bin of the plurality of bins to store the first inventory item;

receive based on the selection of the first bin, from the sensing system, the first sensor signal and the second sensor signal, wherein the second sensor signal is received at predetermined time intervals;

detect whether the pick-put operation is being performed on the first inventory item based on the first sensor signal;

detect based on the second sensor signal, whether the occupancy state of any of the plurality of bins is changed and whether the hand of the operator is present in the vicinity of any of the plurality of bins; and determine whether the pick-put operation of the first inventory item is successful or unsuccessful based on the detection that the occupancy state of any of the plurality of bins has changed and the hand of the operator is present in the vicinity of any of the plurality of bins, wherein the operator is one of a human operator or a robotic operator, the sensing system is a light detection and ranging (LiDAR) system that is:

mounted externally to the plurality of bins, configured to change position, configured to generate the first sensor signal and the second sensor signal, and configured to sense both of a human operator and a robotic operator, wherein the second sensor signal that is generated by the sensing system and transmitted to the control server indicates a presence of the hand of the operator based on an obstruction detected by the sensing system in the vicinity of any of the plurality of bins.

12. The system of claim 11, wherein the control server detects that the pick-put operation is being performed on the first inventory item based on the first sensor signal, and wherein the first sensor signal indicates that the first position and the second position are the same.

13. The system of claim 11, further comprising a robotic apparatus, wherein the first inventory item is placed above the robotic apparatus.

14. The system of claim 11, wherein the storage system is a pick-put to light (PPTL)-based system, wherein the storage system further comprises a first visual indicator and a second visual indicator, wherein the first visual indicator is mapped to the first bin, and the second visual indicator is mapped to a second bin of the plurality of bins, and wherein the storage system is configured to (i) illuminate the first visual indicator based on a first illumination signal and a second illumination signal, and (ii) the second visual indicator based on a third illumination signal.

15. The system of claim 14, wherein the control server is further configured to:

generate the first illumination signal based on the selection of the first bin; and transmit to the PPTL-based system, the first illumination signal, wherein based on the first illumination signal, the first visual indicator illuminates in a first color to set the first bin as a target for the pick-put operation of the first inventory item.

16. The system of claim 14, wherein the control server is further configured to:

generate the second illumination signal based on the determination that the pick-put operation of the first inventory item is successful, wherein the control server determines that the pick-put operation of the first inventory item is successful based on the detection of change in the occupancy state of the first bin and the hand of the operator is present in the vicinity of the first bin; and transmit the second illumination signal to the PPTL-based system, wherein based on the second illumination signal, the first visual indicator illuminates in a second color as an acknowledgment for a successful completion of the pick-put operation.

17. The system of claim 14, wherein the control server is further configured to:

generate the third illumination signal when the control server determines that the pick-put operation is unsuccessful based on (i) the detection that the occupancy state of the first bin remains unchanged and the occupancy state of the second bin is changed or (ii) the hand of the operator is detected to be present in the vicinity of the second bin instead of the first bin; and transmit the third illumination signal to the PPTL-based system, wherein based on the third illumination signal, the second visual indicator illuminates in a third color to indicate that the first inventory item is incorrectly stored in the second bin after the pick-put operation.

* * * * *